(12) United States Patent
Tamura et al.

(10) Patent No.: US 8,349,521 B2
(45) Date of Patent: Jan. 8, 2013

(54) MEMBRANE ELECTRODE ASSEMBLY

(75) Inventors: Jun Tamura, Yokohama (JP); Yoshihiko Nakano, Yokohama (JP); Hideo Oota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1568 days.

(21) Appl. No.: 11/184,945

(22) Filed: Jul. 20, 2005

(65) Prior Publication Data

US 2006/0019148 A1  Jan. 26, 2006

(30) Foreign Application Priority Data

Jul. 21, 2004 (JP) .................................. 2004-213288
Mar. 30, 2005 (JP) .................................. 2005-098230

(51) Int. Cl.
*H01M 4/02* (2006.01)

(52) U.S. Cl. ........ 429/528; 429/532; 429/529; 429/530; 429/483

(58) Field of Classification Search .................... 429/44, 429/33, 30, 34, 40, 41; 252/62.2; 501/103, 501/153, 154
See application file for complete search history.

(56) References Cited

U.S. PATENT DOCUMENTS

| | | | | |
|---|---|---|---|---|
| 6,299,744 | B1 * | 10/2001 | Narayanan et al. | 204/263 |
| 6,523,699 | B1 * | 2/2003 | Akita et al. | 210/490 |
| 7,125,822 | B2 * | 10/2006 | Nakano et al. | 502/339 |
| 2004/0038105 | A1 | 2/2004 | Hennige et al. | |
| 2005/0003263 | A1 * | 1/2005 | Mallari et al. | 429/44 |
| 2007/0059577 | A1 | 3/2007 | Takeuchi et al. | |

FOREIGN PATENT DOCUMENTS

| | | |
|---|---|---|
| JP | 2002-216537 | 8/2002 |
| JP | 2003-142124 | 5/2003 |
| JP | 2003-151580 | 5/2003 |
| JP | 2004-79244 | 3/2004 |
| JP | 2004-296243 | 10/2004 |
| WO | WO 2004/038839 A1 | 5/2004 |

OTHER PUBLICATIONS

U.S. Appl. No. 12/302,949, filed Dec. 12, 2008, Tamura, et al.
U.S. Appl. No. 11/389,088, filed Mar. 27, 2006, Tamura, et al.
U.S. Appl. No. 12/372,135, filed Feb. 17, 2009, Tamura, et al.
U.S. Appl. No. 12/050,397, filed Mar. 18, 2008, Nakano et al.
U.S. Appl. No. 11/744,267, filed May 4, 2007, Tamura, et al.
U.S. Appl. No. 11/778,937, filed Jul. 17, 2007, Tamura, et al.
U.S. Appl. No. 11/537,219, filed Sep. 29, 2006, Tamura, et al.

* cited by examiner

*Primary Examiner* — Raymond Alejandro
(74) *Attorney, Agent, or Firm* — Oblon, Spivak, McClelland, Maier & Neustadt, L.L.P.

(57) ABSTRACT

A membrane electrode assembly includes a fuel electrode, an oxidizing agent electrode, and an electrolyte membrane provided between the fuel electrode and the oxidizing agent electrode with at least one of the fuel electrode and the oxidizing agent electrode contains a proton conductive inorganic oxide, which includes an oxide carrier containing Ti, Zr, Si and/or Al; and W, Mo, Cr and/or V oxide particles supported on a surface of the oxide carrier.

8 Claims, 1 Drawing Sheet

MEMBRANE ELECTRODE ASSEMBLY

CROSS-REFERENCE TO RELATED APPLICATIONS

This application is based upon and claims the benefit of priority from prior Japanese Patent Applications No. 2004-213288, filed Jul. 21, 2004; and No. 2005-098230, filed Mar. 30, 2005, the entire contents of both of which are incorporated herein by reference.

BACKGROUND OF THE INVENTION

1. Field of the Invention

The present invention relates to a proton conductive solid electrolyte adapted for use in an electrode for a fuel cell or in a proton conductive membrane, to a membrane electrode assembly including a proton conductive solid electrolyte or a proton conductive membrane, and to a fuel cell comprising a membrane electrode assembly.

2. Description of the Related Art

Intensive research is being conducted on a proton conductive solid electrolyte for application in an electrochromic material and a sensor, particularly, in recent years in a fuel cell having a high energy density that is operated at low temperatures.

The fuel cell comprises a proton conductive film. A fuel electrode, which is also called an anode, is formed on one surface of the proton conductive film, and an oxidizing agent electrode, which is also called a cathode, is formed on the other surface of the proton conductive film. A fuel such as hydrogen or methanol is supplied to the fuel electrode (anode), and an oxidizing agent is supplied to the cathode. The fuel is electrochemically oxidized in the anode to form protons and electrons, which flow into an external circuit. The protons thus formed are transferred through the proton conductive film to reach the cathode, with the result that the oxidizing agent reacts with the electrons supplied from the external circuit to form water, thereby delivering electrical energy.

An ion exchange membrane formed of an organic polymer material containing perfluorosulfonic acid is known as the proton conductive film. To be more specific, the known proton conductive film includes, for example, an electrolyte containing a tetrafluoro ethylene-perfluoro vinyl ether copolymer as a base material and a sulfonic acid group as an ion exchange group. An example of this proton conductive film is a NAFION film manufactured by Dupont Inc. In the case of using the polymer material containing a perfluorosulfonic acid as an electrolyte, the water contained in the film is decreased by the drying to lower the proton conductivity. As a result, a severe water control is required in the case of using the electrolyte noted above at about 100° C. at which a high output can be obtained to make the system highly complex. Also, the polymer material containing perfluorosulfonic acid has a cluster structure, leading to a sparse molecular structure, with the result that a crossover phenomenon in which an organic liquid fuel such as methanol permeates through the electrolyte membrane to reach the cathode. Where the crossover phenomenon has been generated, the supplied liquid fuel reacts directly with the oxidizing agent, resulting in failure to deliver the generated electricity. It follows that a problem is brought about such that it is impossible to obtain a stable output.

A metal oxide that supports sulfuric acid and has a solid super acidity is disclosed in, for example, Japanese Patent Disclosure (Kokai) No. 2002-216537 as an inorganic acid-based ion exchange film. To be more specific, sulfuric acid is supported on the surface of an oxide containing at least one element selected from the group consisting of zirconium, titanium, iron, tin, silicon, aluminum, molybdenum and tungsten, and the oxide supporting the sulfuric acid is subjected to a heat treatment to immobilize the sulfuric acid on the surface of the oxide. In the metal oxide supporting sulfuric acid, the proton conductivity is produced by the immobilized sulfate group. However, since the sulfate group is decomposed by hydrolysis, the proton conductivity is lowered. It follows that the metal oxide supporting sulfuric acid is considered to be unstable when used in a fuel cell in which water is generated in the electricity generating process, particularly when used as a proton conductive film in a fuel cell using a liquid fuel.

Further, it is disclosed in Japanese Patent Disclosure No. 2003-142124 that a metal oxide hydrate exhibiting a proton conductivity is used as a proton conductive material. However, use of the metal oxide hydrate gives rise to the problem that, if the water of hydration is removed by the drying caused by the power generation under high temperatures, the construction of the metal oxide hydrate is shrunk, and the metal oxide is not brought back to the original form of the hydrate even if water is supplied later, resulting in failure to obtain adequate electricity generating performance.

BRIEF SUMMARY OF THE INVENTION

An object of the present invention is to provide a proton conductive solid electrolyte capable of producing high output characteristics, an electrode for a fuel cell, a proton conductive membrane, a membrane electrode assembly and a fuel cell.

According to a first aspect of the present invention, there is provided a proton conductive solid electrolyte comprising a proton conductive inorganic oxide including an oxide carrier and oxide particles supported on a surface of the oxide carrier, the oxide carrier containing an element Y consisting of at least one element selected from the group consisting of Ti, Zr, Si and Al, and the oxide particles containing an element X consisting of at least one element selected from the group consisting of W, Mo, Cr and V.

According to a second aspect of the present invention, there is provided an electrode for a fuel cell, the electrode including a catalyst layer containing a redox catalyst and a proton conductive inorganic oxide:

wherein, the proton conductive inorganic oxide includes an oxide carrier and oxide particles supported on a surface of the oxide carrier, the oxide carrier containing an element Y consisting of at least one element selected from the group consisting of Ti, Zr, Si and Al, and the oxide particles containing an element X consisting of at least one element selected from the group consisting of W, Mo, Cr and V.

According to a third aspect of the present invention, there is provided a membrane electrode assembly comprising a fuel electrode, an oxidizing agent electrode, and an electrolyte membrane provided between the fuel electrode and the oxidizing agent electrode, wherein;

at least one of the fuel electrode, the oxidizing agent electrode and the electrolyte membrane contains a proton conductive inorganic oxide; and the proton conductive inorganic oxide includes an oxide carrier and oxide particles supported on a surface of the oxide carrier, the oxide carrier containing an element Y consisting of at least one element selected from the group consisting of Ti, Zr, Si and Al, and the oxide particles containing an element X consisting of at least one element selected from the group consisting of W, Mo, Cr and V.

According to a fourth aspect of the present invention, there is provided a fuel cell comprising a fuel electrode, an oxidizing agent electrode, and an electrolyte membrane provided between the fuel electrode and the oxidizing agent electrode, wherein;

at least one of the fuel electrode, the oxidizing agent electrode and the electrolyte membrane contains a proton conductive inorganic oxide; and the proton conductive inorganic oxide includes an oxide carrier and oxide particles supported on a surface of the oxide carrier, the oxide carrier containing an element Y consisting of at least one element selected from the group consisting of Ti, Zr, Si and Al, and the oxide particles containing an element X consisting of at least one element selected from the group consisting of W, Mo, Cr and V.

According to a fifth aspect of the present invention, there is provided a proton conductive membrane comprising:

a proton conductive inorganic oxide having a solid super acidity; and a hydrophilic polymer material containing at least one atomic group selected from the group consisting of a hydroxyl group, a carboxyl group, an ether bond, and an amide bond.

According to a sixth aspect of the present invention, there is provided a membrane electrode assembly comprising a fuel electrode, an oxidizing agent electrode, and an electrolyte membrane provided between the fuel electrode and the oxidizing agent electrode; wherein at least one of the fuel electrode, the oxidizing agent electrode and the electrolyte membrane comprises:

a proton conductive inorganic oxide having a solid super acidity; and a hydrophilic polymer material containing at least one atomic group selected from the group consisting of a hydroxyl group, a carboxyl group, an ether bond, and an amide bond.

Further, according to a seventh aspect of the present invention, there is provided a fuel cell comprising a fuel electrode, an oxidizing agent electrode, and an electrolyte membrane provided between the fuel electrode and the oxidizing agent electrode; wherein at least one of the fuel electrode, the oxidizing agent electrode and the electrolyte membrane comprises:

a proton conductive inorganic oxide having a solid super acidity; and a hydrophilic polymer material containing at least one atomic group selected from the group consisting of a hydroxyl group, a carboxyl group, an ether bond, and an amide bond.

DETAILED DESCRIPTION OF THE INVENTION

Figure 1:
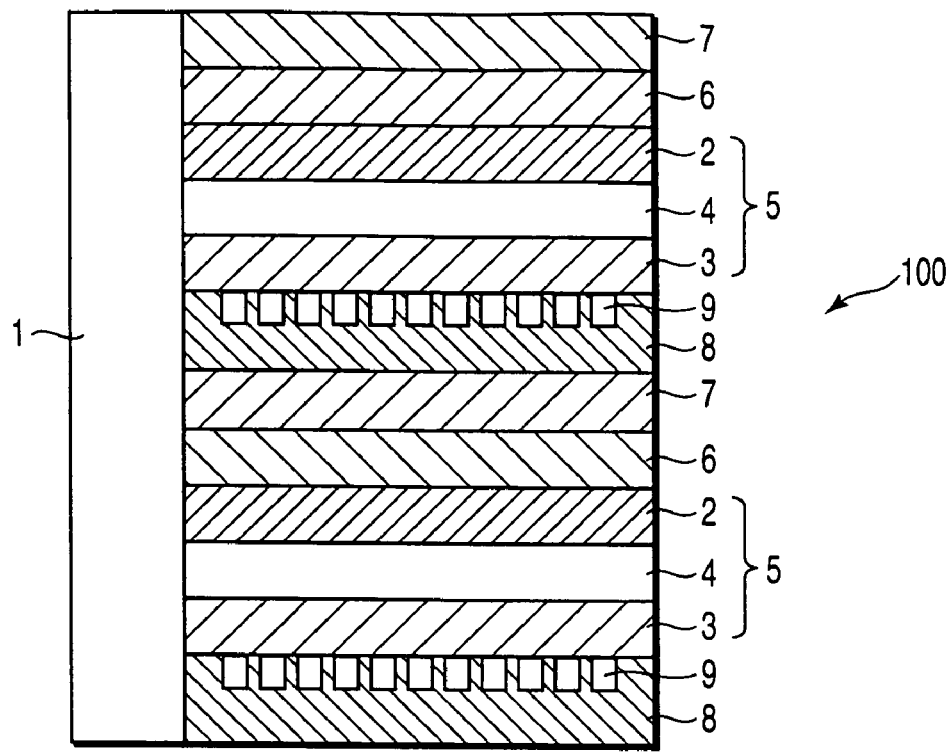
FIG. 1 is a cross-sectional view schematically showing the construction of a liquid fuel cell according to one embodiment of the fuel cell of the present invention.

As described previously, it is impossible for the fuel cell disclosed in the patent documents quoted previously to produce a high output. Further, the fuel cell gives rise to additional problems as described in the following. Specifically, a large amount of water is required for the proton conduction in the proton conductive solid electrolyte to make it necessary to supply a sufficiently large amount of water to the electrolyte. Therefore, for obtaining stable supply of an electric current, it is absolutely necessary to employ a water control requiring a complex system. Also, in the case of a fuel cell using a liquid fuel such as methanol, it was impossible to control sufficiently the crossover of methanol, resulting in failure to obtain a stable output.

According to the proton conductive inorganic oxide described in the following, it is possible for the fuel cell to produce high output characteristics. In addition, the water control can be performed easily, and it is possible to suppress the crossover of the liquid fuel such as methanol. Further, the ionic conductivity can be maintained with a high stability over a wide temperature region ranging between room temperature and high temperatures of about 150° C.

The proton conductive inorganic oxide contains an oxide carrier containing an element Y consisting of at least one element selected from the group consisting of Ti, Zr, Si and Al and oxide particles supported on the surface of the oxide carrier and containing an element X consisting of at least one element selected from the group consisting of W, Mo, Cr and V. The particular oxide is called herein a proton conductive inorganic oxide containing elements X and Y for brevity.

The proton conduction mechanism in the proton conductive inorganic oxide containing elements X and Y has not yet been clarified sufficiently. However, it is considered reasonable to understand that since the oxide particles containing the element X, i.e., oxide particles B, are supported on the surface of the oxide carrier containing the element Y, i.e., oxide carrier A, the Lewis acid point is formed within the structure of the oxide particle B, and a proton acid point is formed by the hydration of the Lewis acid point, thereby forming the proton conduction. It is also considered reasonable to understand that, where the proton conductive inorganic oxide has an amorphous structure, the amorphous structure also contributes to the promotion in the formation of the Lewis acid points.

In addition to the proton forming reaction performed by the Lewis acid point, the number of molecules of the entrained water required for the proton conduction can be decreased to make it possible to obtain a high proton conductivity with a small amount of water molecules present on the surface of the proton conductive inorganic oxide. Such being the situation, it is possible to obtain a high power density without requiring a strict water control in the power generating stage. Under the circumstances, it is possible to decrease the cell resistance and to increase the maximum power density of fuel cell by allowing at least one of the fuel electrode, the oxidizing agent electrode and the electrolyte membrane to contain the proton conductive inorganic oxide.

It should also be noted that, according to the proton conductive solid electrolyte containing the proton conductive inorganic oxide, it is possible to suppress the permeation of a liquid fuel such as methanol. Particularly, if a polymer material is added for the bonding of the proton conductive inorganic oxide, the density of the proton conductive solid electrolyte can be further increased to suppress more effectively the permeation of the liquid fuel.

Incidentally, the oxide particle B is soluble in water, though the solubility is changed depending on the constituting elements of the oxide and the environment of the pH value. Since the oxide particle B is supported on the surface of the oxide carrier A having a low solubility in water, it is possible to suppress the dissolution of the oxide particle B in water, with the result that the stability of the proton conductive inorganic oxide relative to water and the liquid fuel can be increased. It is also possible to avoid the contamination of the other fuel cell material and the fuel cell apparatus caused by the eluted ions of the oxide particle B. It follows that, according to the present invention, it is possible to obtain a fuel cell exhibiting high reliability over a long time. Further, since the cheap oxide carrier A is used as a base material, the manufacturing cost of the fuel cell can be suppressed.

The construction that the oxide particle B is supported on the surface of the oxide carrier A can be confirmed by the apparatus analysis such as an X-ray diffraction (XRD), an electron probe microanalysis (EPMA), an X-ray photoelectron spectroscopy (XPS) or an energy dispersion type X-ray analysis (EDX). Also, since the oxide particle B is colored, i.e., yellow for W, gray for Mo, green for Cr, and orange for V, though the oxide carrier A is white regardless of the kind of the metal, the visual confirmation can also be performed.

The oxide carrier A can be synthesized by a gaseous phase method in which the oxide is obtained by decomposing a gas containing the element Y (i.e., at least one element selected from the group consisting of Ti, Zr, Si and Al) or by, for example, a sol-gel method in which the metal alkoxide containing the element Y noted above is used as the raw material. Of course, the synthesizing method of the oxide carrier A is not particularly limited in the present invention. It is also possible to use a composite oxide containing a plurality of elements as the oxide carrier A. To be more specific, it is possible to use, for example, $TiO_2$, $ZrO_2$, $SiO_2$, $Al_2O_3$, $Al_2O_3$—$SiO_2$, $TiO_2$—$SiO_2$, or $ZrO_2$—$SiO_2$ as the oxide carrier A. In order to obtain a sufficiently high proton conductivity, it is desirable to use $ZrO_2$ as the oxide carrier A. On the other hand, in order to obtain a high proton conductivity while suppressing the manufacturing cost of the proton conductive inorganic oxide, it is desirable to use $TiO_2$ as the oxide carrier A. The shape of the oxide carrier A is not particularly limited in the present invention. For example, it is possible for the oxide carrier A to be granular, fibrous, shaped like a flat plate, stratified or porous.

For allowing the oxide particle B to be supported on the surface of the oxide carrier A, it is desirable to disperse the oxide carrier A in a solution having the element X (i.e., at least one element selected from the group consisting of W, Mo, Cr and V) dissolved therein, e.g., an aqueous solution containing, for example, a chloride, a nitrate, a hydroacid, oxonic acid salt, or an alcohol solution of a metal alkoxide, followed by removing the solvent from the solution to permit the solute to be supported on the surface of the oxide carrier A and subsequently applying a heat treatment to obtain the oxide particle B supported on the surface of the oxide carrier A. Of course, the method of allowing the oxide particle B to be supported on the surface of the oxide carrier A is not limited to the method exemplified above. For example, it is also possible for the oxide particle B in the form of a composite oxide containing a plurality of elements to be supported on the surface of the oxide carrier A. Also, it suffices for the oxide particle B to be supported by at least a part of the surface of the oxide carrier A. For example, it is possible for the oxide particles B to be dotted on the surface of the oxide carrier A or to form a stratified structure covering the surface of the oxide carrier A. It should also be noted that it suffices for the oxide particle B to be supported on the surface of the oxide carrier A, and the crystallinity of the oxide particle B or the oxide carrier A is not particularly limited in the present invention. However, it is desirable for each of the oxide particle B and the oxide carrier A to be amorphous in view of the promotion of the Lewis acid point formation, the possibility of contribution to the improvement in the acidity, the reduction of the manufacturing cost of the proton conductive inorganic oxide, and the facilitation of the manufacturing process. Further, it is more desirable for the oxide particle B to be amorphous and for the oxide carrier A to be crystalline. It should also be noted, however, that it is possible to use each of the oxide particle B and the oxide carrier A in the crystalline form, and it is also possible to use the oxide particle B in the crystalline form and to use the oxide carrier A in the amorphous form.

As described above, the surface of the proton conductive inorganic oxide provides the proton conduction field and, thus, it is desirable for the specific surface area of the proton conductive inorganic oxide to be as large as possible. However, it is desirable for the proton conductive inorganic oxide to have a specific surface area falling within a range of 10 to 2,000 $m^2/g$. It should be noted that, where the specific surface area exceeds 2,000 $m^2/g$, it is difficult to handle the proton conductive inorganic oxide and to control a distribution of the proton conductive inorganic oxide particles. On the other hand, where the specific surface in question is smaller than 10 $m^2/g$, it is difficult to obtain a sufficient proton conductivity.

The element ratio (X/Y) is a ratio of the element X contained in the oxide particle B to the element Y contained in the oxide carrier A. If the element ratio X/Y is smaller than 0.0001, the amount of oxide particles B supported on the surface of the oxide carrier A is made excessively small. In this case, the proton conduction field tends to be decreased to lower the proton conductivity. On the other hand, if the element ratio X/Y exceeds 20, the oxide particles B are supported in an excessively large amount on the surface of the oxide carrier A, with the result that the proton conduction field is concealed by the oxide particles B to lower the proton conductivity. Such being the situation, it is desirable for the element ratio (X/Y) of the element X contained in the oxide particle B to the element Y contained in the oxide carrier A to fall within a range of 0.0001 to 20, more desirably 0.01 to 1.

The proton conductive inorganic oxide used in the present invention can be obtained by, for example, allowing the oxide particles B to be supported on the surface of the oxide carrier A, followed by applying a heat treatment to the resultant system under an oxidizing atmosphere such as the air atmosphere. If the heat treating temperature is lower than 200° C., a sufficient chemical bond cannot be formed between the oxide carrier A and the oxide particle B, with the result that the proton conductivity of the resultant proton conductive inorganic oxide tends to be lowered. On the other hand, if the heat treatment is carried out at temperatures exceeding 1,000° C., the oxide particles are fused to each other to diminish the specific surface area of the resultant proton conductive inorganic oxide particles, resulting in failure to obtain a high proton conductivity. Such being the situation, it is desirable for the heat treatment to be applied under temperatures falling within a range of 200 to 1,000° C., more preferably 400 to 700° C. It should also be noted that if the heat treatment is carried out at 200° C., a chemical bond is unlikely to be formed between the oxide carrier A and the oxide particle B because the heat treating temperature is low to make it necessary to apply the heat treatment for a long time. However, if the heat treating temperature is elevated to temperatures of about 1,000° C., a chemical bond tends to be formed easily between the oxide carrier A and the oxide particle B, with the result that the proton conductive inorganic oxide can be synthesized by the heat treatment for a short time.

It is desirable for the proton conductive inorganic oxide to have a solid super acidity. The proton dissociation degree can be represented by the degree of acidity, and the degree of acidity of a solid acid can be represented by the Hammett acidity function $H_0$. In the case of sulfuric acid, the value of $H_0$ is −11.93. It is more desirable for the proton conductive inorganic oxide to exhibit a solid super acidity in which the value of $H_0$ noted above is smaller than −11.93, i.e., $H_0 < -11.93$. It is possible to know the solid super acidity of the proton conductive inorganic oxide by measuring the solid super acidity of the proton conductive membrane as described herein later in conjunction with Examples of the present invention.

It is desirable for the proton conductive solid electrolyte according to the embodiment of the present invention to contain a proton conductive inorganic oxide and a polymer material. It is more desirable for the proton conductive solid electrolyte to be constructed such that the proton conductive inorganic oxide is contained in the polymer material or such that the proton conductive inorganic oxide particles are bonded to each other by the polymer material acting as a binder. The polymer material used in the present invention includes, for example, polystyrene, polyether ketone, polyether ether ketone, polysulfone, polyether sulfone and other engineering plastic materials, though the polymer material is not particularly limited. It is also possible for the polymer material exemplified above to be doped with a proton carrier or for the proton carrier to be chemically bonded to or immobilized on the polymer material exemplified above. Further, it is possible to use a polymer material exhibiting a proton conductivity such as perfluorosulfonic acid. Particularly, it is desirable to use polyacrylonitrile (PAN) as the polymer material because PAN exhibits a high polarity.

In the proton conductive solid electrolyte, it is desirable for the mixing ratio of the proton conductive inorganic oxide to the polymer material to satisfy the condition of inhibiting the permeation of the liquid fuel while maintaining a high proton conductivity. If the weight ratio (S/T) of the proton conductive inorganic oxide to the total weight (T) of the membrane is smaller than 0.5, the continuity of the proton conductive inorganic oxide tends to be lowered to lower the conductivity. Such being the situation, it is desirable for the weight ratio (S/T) noted above to fall within a range of 0.5 to 0.999.

When the proton conductive inorganic oxide is used as a solid electrolyte of a fuel cell, the proton conductive inorganic oxide is used in general in the form of a membrane. However, it is not absolutely necessary for the proton conductive inorganic oxide to be used in the form of a membrane. It is also possible for the proton conductive inorganic oxide used in the present invention to be cylindrical. To be more specific, it is possible to employ the method of casting a dispersed mixture of the proton conductive inorganic oxide and the polymer material in the form of a membrane or a casting method applied to a porous core material, a woven fabric or an unwoven fabric, which is impregnated with the dispersed mixture noted above.

The thickness of the proton conductive solid electrolyte membrane is not particularly limited in the present invention. However, it is desirable for the proton conductive solid electrolyte membrane to have a thickness of at least 10 μm in order to obtain a membrane that can be put to a practical use in view of the mechanical strength, the permeability of the liquid fuel and the proton conductivity. Also, in order to lower the membrane resistance, it is desirable for the proton conductive solid electrolyte membrane to have a thickness not larger than 300 μm. Particularly, it is more desirable for the proton conductive solid electrolyte membrane to have a thickness falling within a range of 10 to 100 μm in order to decrease the internal resistance of the fuel cell.

The method of controlling the thickness of the proton conductive solid electrolyte membrane is not particularly limited in the present invention. For example, where the dispersed mixture of the proton conductive inorganic oxide and the polymer material is subjected to the casting in the form of a membrane, the thickness of the membrane can be controlled by controlling the casting amount of dispersed mixture of the proton conductive inorganic oxide and the polymer material or by controlling the casting area. It is also possible to decrease the thickness of the proton conductive solid electrolyte membrane by heat press by using, for example, a hot press machine.

The electrode will now be described in detail.

The electrode contains a proton conductive inorganic oxide, and can be used as a fuel electrode or an oxidizing agent electrode of the fuel cell or as both the fuel electrode and the oxidizing agent electrode.

According to one embodiment of the present invention, there is provided an electrode comprising a catalyst layer containing a redox catalyst, a proton conductive inorganic oxide, and a polymer material acting as a binder.

Each of the fuel electrode and the oxidizing agent electrode is formed of a structure capable of a gas diffusion such as a porous structure such that the fuel gas, the liquid fuel or the oxidizing gas can be circulated through the fuel electrode and the oxidizing gas electrode. To promote the oxidizing reaction of the fuel on the fuel electrode and for promoting the reducing reaction of oxygen on the oxidizing agent electrode, each of the fuel electrode and the oxidizing agent electrode comprises a catalyst layer in which a metal catalyst is supported on a conductive carrier material such as carbon. The metal catalyst used in the present invention includes, for example, platinum, gold, silver, palladium, iridium, rhodium, ruthenium, iron, cobalt, nickel, chromium, tungsten, molybdenum, manganese and vanadium. These metal catalysts can be used singly or in the form of a binary alloy or a ternary alloy. Particularly, platinum exhibits a high catalytic activity and, thus, is used in many cases. It suffices for the carrier material supporting the metal catalyst to be electrically conductive. A carbon material is widely used as the carrier material supporting the metal catalyst. The carbon material used as the carrier material includes, for example, a carbon black such as a furnace black, a channel black and an acetylene black as well as an activated carbon and graphite.

The method of allowing the metal catalyst to be supported by the carbon carrier material is not particularly limited in the present invention. For example, a carbon material is dispersed in a solution having the metal element forming the metal catalyst dissolved therein, e.g., an aqueous solution containing a chloride, a nitrate, a hydroacid or an oxonic acid salt, or an alcohol solution of a metal alkoxide, followed by removing the solvent to permit the solute to be supported by the carbon carrier material and subsequently applying a heat treatment to the carbon carrier material under a reducing atmosphere to obtain a catalyst having the metal catalyst supported on the carbon material. The metal catalyst has a particle diameter of generally 1 to 50 nm, and the amount of catalyst metal in the electrode is 0.01 to 10 mg/cm$^2$.

It is desirable for the proton conductive inorganic oxide particles contained in the catalyst layer formed on the fuel electrode and the oxidizing agent electrode to have a sufficient continuity because the proton conductive inorganic oxide particles provide a route for transferring protons to the electrolyte membrane. It is possible for the proton conductive inorganic oxide to be supported by the carbon material. Also, it is desirable for the proton conductive inorganic oxide to be used in an amount of 0.01 to 50 mg/cm$^2$ under the state that the proton conductive inorganic oxide is contained in the electrode.

A polymer material is used as a binder for immobilizing the metal catalyst or the carbon carrier material supporting the metal catalyst and the proton conductive inorganic oxide on the catalyst layer. The polymer material, which is not particularly limited in the present invention includes, for example, polystyrene, polyether ketone, polyether ether ketone, polysulfone, polyether sulfone or other engineering plastic materials. Also, it is possible for the polymer material to be doped with proton carriers such as sulfonic acid, phosphoric acid and another proton carrier. It is also possible for these proton carriers to be chemically bonded to or immobilized on the polymer material. Further, it is possible to use the polymer material exhibiting the proton conductivity such as a polymer material formed of, for example, perfluorosulfonic acid. Since it is desirable to form a porous catalyst layer exhibiting a high proton conductivity and a high electric conductivity, it is desirable to pay attentions to the mixing ratio of the metal catalyst, the carbon carrier material supporting the metal catalyst and the proton conductive inorganic oxide to the polymer material. To be more specific, it is desirable for the weight ratio (P/C) of the polymer material P to the total amount of catalyst layer C to fall within a range of 0.001 to 0.5. If the weight ratio P/C is higher than 0.5, the contact area of the proton conductive inorganic oxide and the metal catalyst tends to be lowered to lower the proton conductivity and the electric conductivity.

The method of forming the electrode is not particularly limited in the present invention. For example, it is possible for the electrode to be formed of a catalyst layer alone. It is also possible to obtain the electrode by forming a catalyst layer on another support member. For example, the metal catalyst, the proton conductive inorganic oxide and the polymer material are mixed and dispersed in water or an organic solvent such as alcohol to obtain a slurry, followed by coating a support member with the resultant slurry, and subsequently drying and baking the coated slurry to form a catalyst layer. The support member is not particularly limited. For example, it is possible to use an electrolyte membrane as the support member to obtain a membrane electrode assembly in which the catalyst layer is formed on the electrolyte membrane. Alternatively, it is possible to form a catalyst layer on paper, felt, or cloth made of carbon exhibiting a gas permeability and an electric conductivity to obtain a membrane electrode assembly in combination with an electrolyte membrane.

The membrane electrode assembly according to one embodiment of the present invention comprises a fuel electrode, an oxidizing agent electrode, and an electrolyte membrane interposed between the fuel electrode and the oxidizing agent electrode and containing the proton conductive solid electrolyte described previously. The membrane electrode assembly according to another embodiment of the present invention comprises an electrode including the catalyst layer described previously. Further, the membrane electrode assembly according to still another embodiment of the present invention comprises both an electrode including the catalyst layer noted above and an electrolyte membrane containing the proton conductive solid electrolyte described previously.

The electrolyte membrane and the electrode can be bonded to each other by using an apparatus that permits heating and also permits applying pressure. In general, a hot press machine is used for bonding the electrolyte membrane and the electrode to each other. In this case, it suffices for the pressing temperature to be not lower than the glass transition temperature of the polymer material used as a binder in the electrode and the electrolyte membrane. In general, the pressing temperature is 100 to 400° C. On the other hand, the pressure applied by the hot press machine, which is dependent on the hardness of the electrode used, is 5 to 200 kg/cm$^2$ in general.

The fuel cell comprising the membrane electrode assembly according to the present invention will now be described with reference to the accompanying drawings. Specifically, FIG. 1 is a cross sectional view schematically showing the construction of a liquid fuel cell according to one embodiment of the present invention. As shown in the drawing, the liquid fuel cell comprises a stack 100 prepared by stacking a plurality of unit cells one upon the other. A fuel introducing passageway 1 is arranged on the side surface of the stack 100. A liquid fuel is supplied from a liquid fuel tank (not shown) into the fuel introducing passageway 1 through an introducing pipe (not shown). Each unit cell comprises a membrane electrode assembly 5 including a fuel electrode 2, which is also called an anode, an oxidizing agent electrode 3, which is also called a cathode, and an electrolyte membrane 4 interposed between the fuel electrode 2 and the oxidizing agent electrode 3. It is desirable for each of the fuel electrode 2 and the oxidizing agent electrode 3 to be formed of a conductive porous body in order to permit the fuel and the oxidizing agent gas to be circulated therethrough.

Each unit cell also comprises a fuel evaporating section 6 stacked on the fuel electrode 2, a fuel permeating section 7 stacked on the fuel evaporating section 6, and a cathode separator 8 stacked on the oxidizing agent electrode 3. The fuel permeating section 7 performs the function of holding the liquid fuel, which is supplied from the fuel introducing passageway 1. The fuel evaporating section 6 performs the function of guiding the evaporated component of the liquid fuel held by the fuel permeating section 7 into the fuel electrode 2. An oxidizing agent gas supply groove 9 through which flows the oxidizing agent gas is formed as a continuous groove on that surface of the cathode separator 8 which is positioned to face the oxidizing agent electrode 3. The cathode separator 8 also performs the function of connecting in series the adjacent membrane electrode assemblies 5.

Incidentally, where the stack 100 is prepared by stacking a plurality of units cells as shown in FIG. 1, it is desirable for each of the cathode separator 8, the fuel permeating section 7 and the fuel evaporating section 6 to be formed of a porous conductive body containing carbon because these cathode separator 8 and the sections 6 and 7 noted above also perform the function of a current collecting plate for conducting the generated electrons.

As described above, the separator 8 included in the unit cell shown in FIG. 1 also performs the function of a channel through which flows the oxidizing gas. Since the separator 8 also performs the function of a channel, the number of parts included in the fuel cell can be decreased to make it possible to miniaturize the fuel cell. Alternatively, it is also possible to use an ordinary channel in place of the separator 8.

The liquid fuel can be supplied from the fuel storing tank (not shown) into the liquid fuel passageway 1 by utilizing the gravitational force, i.e., the free fall method. In this method, the liquid fuel can be introduced into the fuel introducing passageway 1 without fail, though there is a limitation that it is necessary to arrange the fuel storing tank in a position higher than the upper surface of the stack 100. It is also possible to utilize the capillary action for introducing the liquid fuel from the fuel storing tank into the liquid fuel introducing passageway 1. In the case of employing the method utilizing the capillary action, it is unnecessary for the junction between the fuel storing tank and the liquid fuel introducing passageway 1, i.e., the inlet port of the fuel formed in the liquid fuel introducing passageway 1, to be positioned higher than the upper surface of the stack 100. It follows that, the combination of the capillary method and the free fall method is advantageous in that the installing site of the fuel tank can be set optionally.

It should be noted, however, that, where the liquid fuel introduced by the capillary action into the liquid fuel introducing passageway 1 is further supplied by the capillary action into the fuel permeating section 7, it is desirable to design the fuel cell such that the capillary action utilized for introducing the liquid fuel into the fuel permeating section 7 is larger than the capillary action utilized for introducing the liquid fuel into the liquid fuel introducing passageway 1. Incidentally, the liquid fuel introducing passageway 1 is not limited to the single liquid fuel passageway 1 extending along the side surface of the stack 100. It is also possible to form another liquid fuel introducing passageway 1 in a manner to extend along the other side surface of the stack 100.

The fuel storing tank described above can be formed detachable from the cell body. Also, by renewing the fuel storing tank, the fuel cell can be operated continuously for a long time. Also, the mechanism for supplying the liquid fuel from the fuel storing tank into the liquid fuel introducing passageway 1 can be constructed to utilize the free fall of the liquid fuel as described above or to permit the liquid fuel to be pushed out by, for example, the inner pressure of the fuel storing tank, or to permit the liquid fuel to be withdrawn by the capillary action of the liquid fuel introducing passageway 1.

The liquid fuel introduced into the liquid fuel introducing passageway 1 by the method described above is supplied into the fuel permeating section 7. The type of the fuel permeating section 7 is not particularly limited as far as the fuel permeating section 7 performs the function retaining the liquid fuel inside the fuel permeating section 7 and supplying the evaporated fuel into the fuel electrode 2 through the fuel evaporating section 6. For example, it is possible for the fuel permeating section 7 to include a liquid fuel passageway and a gas-liquid separating membrane formed at the interface between the fuel permeating section 7 and the fuel evaporating section 6. Further, where the liquid fuel is supplied into the fuel permeating section 7 by utilizing the capillary action without using an auxiliary equipment, the type of the fuel permeating section 7 is not particularly limited as far as the liquid fuel can be permeated by the capillary action. For producing the capillary action, it is possible to use a porous body such as particles or fillers, an unwoven fabric made by the paper-making method, a woven fabric prepared by weaving fibers and a small clearance formed between glass plates or between plastic plates.

As described above, the fuel permeating section 7 can be formed by using a porous body. In this case, the capillary action utilized for introducing the liquid fuel into the fuel permeating section 7 includes the capillary action produced by the porous body of the fuel permeating section 7. In the case of utilizing the capillary action, the pores of the porous fuel permeating section 7 are connected to each other to form a so-called "open pore" and the diameter of the open pore is controlled. Also, the open pore is made to extend from the side surface of the fuel permeating section 7 which faces the liquid fuel introducing passageway 1 to reach at least the other surface of the fuel permeating section 7, thereby making it possible to supply the liquid fuel smoothly in the lateral direction by utilizing the capillary action.

The pore diameter, etc. of the porous body used for forming the fuel permeating section 7 is not particularly limited, as far as the pores are capable of sucking the liquid fuel within the liquid fuel introducing passageway 1. However, it is desirable for the pore diameter of the porous body used for forming the fuel permeating section 7 to be set at about 0.01 to 150 µm in view of the capillary action produced by the liquid fuel introducing passageway 1. Also, it is desirable for the volume of the pores, which provides an index in terms of the continuity of the pores in the porous body, to be set at about 20 to 90%. Where the pore diameter is smaller than 0.01 µm, it is difficult to prepare the fuel permeating section 7. On the other hand, if the pore diameter exceeds 150 µm, the capillary action produced by the porous body forming the fuel permeating section 7 tends to be lowered. Further, if the pore volume is smaller than 20%, the amount of open pores is decreased to increase the amount of closed pores, with the result that it is difficult to obtain a sufficient capillary action. If the pore volume exceeds 90%, however, the mechanical strength of the fuel permeating section is lowered, though it is certainly possible to increase the amount of open pores. In practice, it is desirable for the porous body used for forming the fuel permeating section to have a pore diameter falling within a range of 0.5 to 100 µm and to have a pore volume falling within a range of 30 to 75%.

In the fuel cell of the construction described above, the cell reaction is generated even at room temperature. However, it is desirable for the fuel cell to be operated under high temperatures of 50 to 150° C. because the catalytic activity of the electrode is improved to decrease the over-voltage of electrode. Also, in order to allow the electrolyte membrane to produce sufficiently the proton conductivity, it is desirable for the fuel cell to be operated under temperatures under which the water control can be performed easily. To be more specific, it is desirable for the fuel cell to be operated under temperatures falling within the range of room temperature to 150° C.

Another proton conductive membrane will now be described.

The proton conductive membrane contains a proton conductive inorganic oxide exhibiting a solid super acidity and a hydrophilic polymer material containing at least one hydrophilic group selected from the group consisting of a hydroxyl group, a carboxyl group, an ether bond and an amide bond.

The proton conductive inorganic oxide exhibiting a solid super acidity includes, for example, a solid acid consisting of a metal oxide that supports sulfuric acid as disclosed in Japanese Patent Disclosure No. 2002-216537 quoted previously, and a proton conductive inorganic oxide (hereinafter referred to as a proton conductive inorganic oxide containing elements X and Y) comprising an oxide carrier containing an element Y consisting of at least one element selected from the group consisting of Ti, Zr, Si and Al, and a proton conductive inorganic oxide particle supported on the surface of the oxide carrier and containing an element X consisting of at least one element selected from the group consisting of W, Mo, Cr and V.

In the case of the metal oxide supporting sulfuric acid, the proton conductivity is produced by the sulfate group immobilized on the surface of the metal oxide. However, the sulfate group tends to be decomposed by the hydrolysis. It should be noted in this connection that water is generated in the fuel cell in the process of generating an electric power. Therefore, the proton conductivity tends to be lowered, if a metal oxide supporting sulfuric acid is used as the proton conductive membrane in the fuel cell using a liquid fuel.

On the other hand, the proton conduction mechanism in the proton conductive inorganic oxide containing elements X and y has not yet been clarified sufficiently. However, it is considered reasonable to understand that since the oxide particles containing the element X, i.e., oxide particles B, are supported on the surface of the oxide carrier containing the element Y, i.e., oxide carrier A, the Lewis acid point is formed within the structure of the oxide particle B, and a proton acid point is formed by the hydration of the Lewis acid point, thereby forming the proton conduction field. It is also considered reasonable to understand that, where the proton conductive inorganic oxide has an amorphous structure, the amorphous structure also contributes to the promotion in the formation of the Lewis acid points.

It should also be noted that, in addition to the proton forming reaction performed by the Lewis acid point, the number of molecules of the entrained water required for the proton conduction can be decreased to make it possible to obtain a high proton conductivity with a small amount of water molecules present on the surface of the proton conductive inorganic oxide. Such being the situation, it is unnecessary to apply a strict water control in the power generating stage.

However, the proton conductive membrane containing the proton conductive inorganic oxide is poor in its capability of absorbing water, resulting in failure to supply sufficiently the water required for the proton generation to the solid super acid. It follows that the membrane resistance is rendered somewhat high. Also, in the case of a fuel cell using a liquid fuel such as methanol, it was impossible to control sufficiently the crossover of methanol, resulting in failure to obtain a stable output.

As a result of an extensive research, the present inventors have found that it is possible to suppress the phase separation between the proton conductive inorganic oxide and the hydrophilic polymer material by allowing the proton conductive membrane to contain a hydrophilic polymer material containing at least one functional group selected from the group consisting of a hydroxyl group, a carboxyl group, an ether bond, and an amide bond to make it possible to improve the dispersion capability of the proton conductive inorganic oxide particles. Since the proton conductive membrane thus obtained exhibits a high water absorption capability, it is possible to supply a sufficiently large amount of water to the proton conductive inorganic oxide and, thus, a high proton conductivity can be obtained and the membrane resistance can be lowered. It should also be noted that since the proton conductive membrane has a high density, it is possible to suppress the permeation of the liquid fuel and to suppress the crossover of methanol.

Under the circumstances, the maximum power density of fuel cell can be increased by using the proton conductive membrane as the electrolyte membrane or by allowing the fuel electrode and/or the oxidizing agent electrode to contain the proton conductive inorganic oxide and the hydrophilic polymer material.

As described above, the proton conductive inorganic oxide and a hydrophilic polymer material are included in the proton conductive membrane. It is possible for the proton conductive membrane to select as the proton conductive inorganic oxide the proton conductive inorganic oxide containing the elements X and Y described previously.

The hydrophilic polymer material included in the proton conductive membrane contains in its molecular structure at least one atomic group selected from the group consisting of a hydroxyl group, a carboxyl group, an ether bond and an amide bond.

It is desirable for the proton conductive membrane to be constructed such that the proton conductive inorganic oxide is contained in or bonded to the hydrophilic polymer material. Where water is present on the surface, the solid super acid performs the function of the proton conductor. If a hydrophilic polymer material is selected as a polymer material covering a solid super acid or having a solid super acid bonded thereto, it is possible to supply a sufficiently large amount of water to the solid super acid to realize a proton conductive membrane exhibiting a high proton conductivity.

The hydrophilic polymer material has at least one atomic group selected from the group consisting of a hydroxyl group, a carboxyl group, an ether bond and an amide bond. The hydrophilic polymer material having a hydroxyl group includes, for example, polyvinyl alcohol. The hydrophilic polymer material having a carboxyl group includes, for example, polyacrylic acid. The hydrophilic polymer material having an ether bond includes, for example, polyethylene glycol and cellulose. Further, the hydrophilic polymer material having an amide bond includes, for example, polyamide, and polyvinyl pyrrolidone. It is also conceivable to use as the hydrophilic polymer material an organic polymer material having an ester bond.

Particularly, in the case of using polyvinyl alcohol as the hydrophilic polymer material, the affinity with the proton conductive inorganic oxide is increased to improve the dispersion capability of the proton conductive inorganic oxide particles. It is also possible to suppress the phase separation between the proton conductive inorganic oxide and the hydrophilic polymer material. It follows that it is possible to realize a proton conductive membrane excellent in its water absorbing capability and in its function of suppressing the methanol permeation.

It is desirable for polyvinyl alcohol to have a saponification value of 50% to 100%. If the saponification value is smaller than 50%, the moisture absorption of the membrane tends to be lowered to increase the resistance of the proton conductive membrane. On the other hand, if the saponification value falls within a range of 50 to 100%, the resistance of the proton conductive membrane can be lowered, though it is possible for the methanol permeation to be increased by the increase in the moisture absorption of the proton conductive membrane. The saponification value can be measured as follows. Specifically, polyvinyl alcohol is completely saponified with an alkaline material such as sodium hydroxide. Whether or not the saponification was achieved completely can be confirmed by an infrared absorption analysis. Further, the saponification value can be determined from the amount of acetate obtained by the saponification.

It is desirable for the hydrophilic polymer material to have at least 5% of an equilibrium moisture absorption rate under temperatures not lower than 20° C. The hydrophilic polymer material meeting this requirement exhibits a high capability of absorbing water and, thus, the resistance of the proton conductive membrane can be further decreased. It is more desirable for the hydrophilic polymer material to exhibit an equilibrium moisture absorption rate of 5% to 95% under temperatures of 20° C. to 90° C.

Incidentally, the equilibrium moisture absorption rate was obtained by measuring first the weight of a sample film that was left to stand under an environment having a constant temperature set at 20° C. or more and a constant relative humidity set at 95% or more for one week to permit the moisture absorption amount to reach the state of equilibrium and, then, measuring the weight of the sample film after the drying for 2 hours at 105° C. Naturally, the equilibrium absorption rate was obtained on the basis of the difference in weight between the sample film before the drying stage and the sample film after the drying stage. Incidentally, the sample film was prepared by dissolving a hydrophilic polymer material in water to obtain a slurry and by casting the resultant slurry.

It is desirable for the mixing ratio of the hydrophilic polymer material to the proton conductive inorganic oxide to satisfy the condition of inhibiting the permeation of the liquid fuel while maintaining a high proton conductivity. If the weight ratio (S/T) of the proton conductive inorganic oxide (S) to the total amount (T) of the membrane is lower than 0.1, the continuity of the proton conductive inorganic oxide tends to be lowered to lower the conductivity. Such being the situation, it is desirable for the weight ratio (S/T) noted above to fall within a range of 0.1 to 0.999.

The proton conductive membrane can be manufactured by, for example, preparing first a slurry obtained by dispersing the proton conductive inorganic oxide particles and the hydrophilic polymer material in a polar solvent such as water or alcohol, followed by casting the slurry on a glass substrate or a resin substrate, and subsequently removing the solvent by the drying and further applying a heat treatment to the dried membrane under temperatures not higher than 200° C. The mechanism of the effect produced by the heat treatment has not yet been clarified sufficiently. However, it is considered reasonable to understand that the oxidizing reaction and the dehydrating reaction between the proton conductive inorganic oxide and the hydrophilic polymer material, as well as the interaction of hydrogen bonds and the crystallization of the hydrophilic polymer material are brought about by the heat treatment noted above, which is applied under temperatures not higher than 200° C., to prevent the swelling and the dissolution of the hydrophilic polymer material. The result of an infrared spectroscopic analysis (1R) suggests at least the situation that, by the heat treatment carried out under temperatures not higher than 200° C., the hydrophilic hydroxyl group in the polyvinyl alcohol is oxidized by the solid super acid to be converted into a hydrophobic ketone group.

If the proton conductive membrane is manufactured by preparing a slurry by using polyvinyl alcohol by the method described above and by applying the heat treatment noted above, the solubility of polyvinyl alcohol in a polar solvent such as water can be lowered appropriately without impairing the affinity with the proton conductive inorganic oxide to make it possible to allow the proton conductive membrane to maintain its shape in the stage of absorbing water while maintaining a good dispersion stability of the slurry. It follows that it is possible to provide a proton conductive membrane excellent in its water absorbing capability and in its effect of suppressing the methanol permeation. Also, since the application of the heat treatment noted above makes it possible to obtain a membrane excellent in its capability of retaining its shape even if water is used as a solvent in preparing the slurry, the use of water as a solvent permits further improving the hydrophilic properties of the membrane.

It is necessary for the heat treatment to be applied under temperatures that do not cause the hydrophilic polymer material to be decomposed or deteriorated. To be more specific, it is desirable to apply the heat treatment under temperatures not higher than 200° C. Also, in order to permit the heat treatment to produce a sufficient effect, it is desirable for the heat treating temperature to be set at 100° C. or higher. It is more desirable for the heat treating temperature to fall within a range of 130° C. to 180° C.

Where the proton conductive membrane is used as a solid electrolyte membrane in a fuel cell, the proton conductive material is used in general in the form of a sheet. However, it is not absolutely necessary for the proton conductive membrane to be used in the form of a sheet. For example, it is possible for the proton conductive inorganic material to be molded into a cylindrical form. To be more specific, it is possible to employ a casting method in which a dispersed mixture of the proton conductive inorganic oxide and the hydrophilic polymer material is cast directly into the shape of a membrane or to employ a casting method utilizing impregnation in which a porous core material, a woven fabric or an unwoven fabric impregnated with the dispersed mixture noted above.

The thickness of the proton conductive solid electrolyte membrane is not particularly limited in the present invention. However, it is desirable for the proton conductive solid electrolyte membrane to have a thickness of at least 10 µm in order to permit the membrane to withstand the practical use in terms of the mechanical strength, the permeability of the liquid fuel, and the proton conductivity. It is also desirable for the proton conductive solid electrolyte membrane to have a thickness not larger than 300 µm in order to decrease the membrane resistance. Particularly, in order to decrease the internal resistance of the fuel cell, it is more desirable for the proton conductive solid electrolyte membrane to have a thickness of 10 to 100 µm.

The method of controlling the thickness of the proton conductive solid electrolyte membrane is not particularly limited in the present invention. For example, where the dispersed mixture of the proton conductive inorganic oxide and the hydrophilic polymer material is subjected to the casting in the form of a membrane, the thickness of the membrane can be controlled by controlling the casting amount of dispersed mixture of the proton conductive inorganic oxide and the hydrophilic polymer material or by controlling the casting area. It is also possible to decrease the thickness of the proton conductive solid electrolyte membrane by heat press by using, for example, a hot press machine.

The electrode will now be described in detail.

The electrode comprises a proton conductive inorganic oxide exhibiting a solid super acidity and a hydrophilic polymer material having at least one atomic group selected from the group consisting of a hydroxyl group, a carboxyl group, an ether bond and an amide bond. The particular electrode can be used as a fuel electrode or an oxidizing agent electrode, or both as the fuel electrode and the oxidizing agent electrode.

The electrode according to one embodiment of the present invention comprises a catalyst layer containing a redox catalyst, the proton conductive inorganic oxide, and the hydrophilic polymer material that also acts as a binder.

Each of the fuel electrode and the oxidizing agent electrode is formed of a structure capable of a gas diffusion such as a porous structure such that the fuel gas, the liquid fuel or the oxidizing gas can be circulated through the fuel electrode and the oxidizing gas electrode. To promote the oxidizing reaction of the fuel on the fuel electrode and to promote the reducing reaction of oxygen on the oxidizing agent electrode, each of the fuel electrode and the oxidizing agent electrode comprises a catalyst layer in which a metal catalyst is supported on a conductive carrier material such as carbon. The metal catalyst includes, for example, platinum, gold, silver, palladium, iridium, rhodium, ruthenium, iron, cobalt, nickel, chromium, tungsten, molybdenum, manganese and vanadium. These metal catalysts can be used singly or in the form of a binary alloy or a ternary alloy. Particularly, platinum exhibits a high catalytic activity and, thus, is used in many cases. It suffices for the carrier material supporting the metal catalyst to be electrically conductive. A carbon material is widely used as the carrier material supporting the metal catalyst. The carbon material used as the carrier material includes, for example, a carbon black such as a furnace black, a channel black and an acetylene black as well as an activated carbon and graphite.

The method of allowing the metal catalyst to be supported by the carbon carrier material is not particularly limited in the present invention. For example, a carbon material is dispersed in a solution having the metal element forming the metal catalyst dissolved therein, e.g., an aqueous solution containing a chloride, a nitrate, a hydroacid or an oxonic acid salt, or an alcohol solution of a metal alkoxide, followed by removing the solvent to permit the solute to be supported by the carbon carrier material and subsequently applying a heat treatment to the carbon carrier material under a reducing atmosphere to obtain a catalyst having the metal catalyst supported on the carbon material. The metal catalyst has a particle diameter of generally 1 to 50 nm, and the amount of catalyst metal in the electrode is 0.01 to 10 mg/cm$^2$.

It is desirable for the proton conductive inorganic oxide contained in the catalyst layer formed on the fuel electrode and the oxidizing agent electrode to have a sufficient contact area because the proton conductive inorganic oxide provides a route for transferring protons to the electrolyte membrane. It is possible for the proton conductive inorganic oxide to be supported by the carbon material. Also, it is desirable for the proton conductive inorganic oxide to be used in an amount of 0.01 to 50 mg/cm$^2$ under the state that the proton conductive inorganic oxide is contained in the electrode.

A hydrophilic polymer material is used as a binder for immobilizing the metal catalyst or the carbon carrier material supporting the metal catalyst and the proton conductive inorganic oxide on the catalyst layer. The hydrophilic polymer material, which is not particularly limited in the present invention includes, for example, those described previously in conjunction with the description of the proton conductive membrane. Since it is desirable to form a porous catalyst layer exhibiting a high proton conductivity and a high electric conductivity, it is desirable to pay attentions to the mixing ratio of the hydrophilic polymer material to the metal catalyst or the carbon carrier material supporting the metal catalyst and the proton conductive inorganic oxide. To be more specific, it is desirable for the weight ratio (P/C) of the polymer material P to the total amount of catalyst layer C to fall within a range of 0.001 to 0.5. If the weight ratio P/C is higher than 0.5, the interaction between the proton conductive inorganic oxide particles and the metal catalyst tends to be lowered to lower the proton conductivity and the electric conductivity.

The electrode can be formed of a catalyst layer alone. Alternatively, it is possible to form a catalyst layer on another carrier body to obtain the electrode. The method of preparing the electrode is not particularly limited in the present invention. For example, the metal catalyst, the proton conductive inorganic oxide and the hydrophilic polymer material are mixed and dispersed in an organic solvent such as water or alcohol to obtain a slurry, followed by coating a support member with the resultant slurry, and subsequently drying and baking the coated slurry to form a catalyst layer. The support member is not particularly limited. For example, it is possible to use an electrolyte membrane as the support member to obtain a membrane electrode assembly in which the catalyst layer is formed on the electrolyte membrane. Alternatively, it is possible to form a catalyst layer on paper, felt, or cloth made of carbon exhibiting a gas permeability and an electric conductivity to obtain a membrane electrode assembly in combination with an electrolyte membrane.

The membrane electrode assembly according to one embodiment of the present invention comprises a fuel electrode, an oxidizing agent electrode, and an electrolyte membrane interposed between the fuel electrode and the oxidizing agent electrode and containing the proton conductive membrane described previously. Also, according to another embodiment of the present invention, the fuel electrode and/or the oxidizing agent electrode comprises the catalyst layer described previously. Further, according to still another embodiment of the present invention, the fuel electrode and/or the oxidizing agent electrode comprises the catalyst layer noted above, and the electrolyte membrane comprises the proton conductive membrane described previously.

The electrolyte membrane and the electrode can be bonded to each other by using an apparatus that permits heating and also permits applying pressure. In general, a hot press machine is used for bonding the electrolyte membrane and the electrode to each other. In this case, it suffices for the pressing temperature to be not lower than the glass transition temperature of the hydrophilic polymer material used as a binder in the electrode and the electrolyte membrane. In general, the pressing temperature is 100 to 400° C. On the other hand, the pressure applied by the hot press machine, which is dependent on the hardness of the electrode used, is 5 to 200 kg/cm$^2$ in general.

Figure 2:
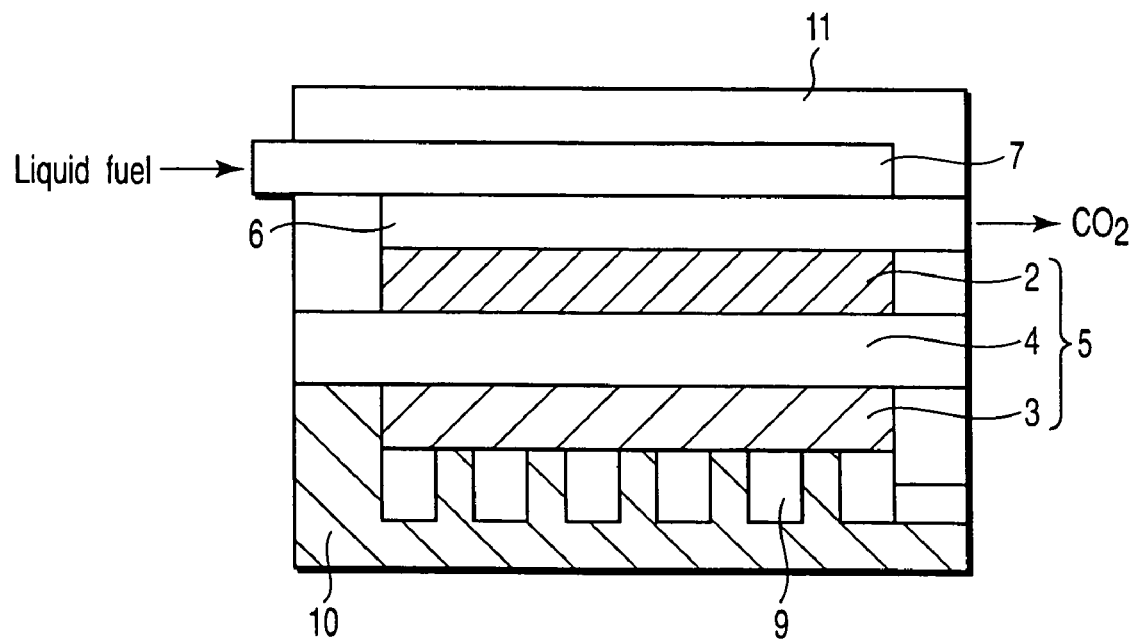
FIG. 2 is a cross-sectional view schematically showing the construction of the liquid fuel cell for Example 1 of the present invention.

The fuel cell comprising the membrane electrode assembly according to one embodiment of the present invention is constructed as shown in FIGS. 1 and 2.

The present invention will now be described more in detail with reference to Examples of the present invention. Of course, the technical scope of the present invention is not limited by the following Examples.

EXAMPLE 1

A mixed solution prepared by adding 5 g of silicon dioxide SiO$_2$ to 300 mL of distilled water having 2 g of vanadium chloride VCl$_3$ dissolved therein was heated to 80° C. while stirring the solution to remove water at an evaporating rate of 100 mL/hour. Then, the residue was left to stand at 100° C. for 12 hours within a drying apparatus to obtain a powdery material. The powdery material thus obtained was pulverized by using an agate mortar, followed by heating the pulverized powdery material within an alumina crucible to 700° C. at a heating rate (temperature elevation rate) of 100° C./hour. The pulverized material was held at 700° C. for 4 hours to obtain a proton conductive inorganic oxide powder, i.e., powder of a composite material formed of vanadium oxide supported by silicon dioxide. The composite material was found to have 0.1 of an element ratio X/Y of the vanadium element X in the vanadium oxide to the silicon element Y in the silicon dioxide and also have a specific surface area as shown in Table 1. The proton conductive inorganic oxide powder formed of vanadium oxide supported by silicon dioxide was subjected to an X-ray diffraction measurement, with the result that all the diffraction peaks observed were found to have been derived from silicon dioxide, supporting that vanadium oxide had an amorphous structure.

Incidentally, the element ratio X/Y and the specific surface area of the proton conductive inorganic oxide powder were measured by the methods described in the following.

The element ratio X/Y was measured by an energy dispersion type X-ray analysis (EDX), an X-ray photoelectron spectroscopy (XPS) or an atomic absorption spectroscopy, and the specific surface area was measured by a BET method.

The proton conductive inorganic oxide powder in an amount of 1 g was added to 2 g of an N,N-dimethyl acetamide (DMAc) solution containing 5% of polyacrylonitrile (PAN), and the resultant system was kept stirred for 10 minutes at room temperature to obtain a slurry. The slurry thus obtained was put in a petri dish made of a tetrafluoroethylene-perfluoroalkoxy vinyl ether copolymer (PFA) to dry the slurry at 60° C. under the air atmosphere. As a result, the solvent of the slurry was removed by evaporation to obtain an electrolyte membrane. The ratio S/T of the proton conductive inorganic oxide material S to the total membrane amount T was found to be 0.9, and the thickness of the electrolyte membrane was found to be 150 μm.

EXAMPLE 2

A mixed solution prepared by adding 5 g of silicon dioxide $SiO_2$ to 300 mL of distilled water having 3 g of chromium chloride hexahydrate $CrCl_3.6H_2O$ dissolved therein was heated to 80° C. while stirring the solution to remove water at an evaporating rate of 100 mL/hour. Then, the residue was left to stand at 100° C. for 12 hours within a drying apparatus to obtain a powdery material. The powdery material thus obtained was pulverized by using an agate mortar, followed by heating the pulverized powdery material within an alumina crucible to 700° C. at a heating rate of 100° C./hour. The pulverized material was held at 700° C. for 4 hours to obtain a proton conductive inorganic oxide powder, i.e., powder of a composite material formed of chromium dioxide supported by silicon dioxide. The composite material was found to have 0.1 of an element ratio X/Y of the chromium element X in the chromium oxide to the silicon element Y in the silicon dioxide and also have a specific surface area as shown in Table 1.

The proton conductive inorganic oxide powder in an amount of 1 g was added to 2 g of a DMAc solution containing 5% of PAN, and the resultant system was kept stirred for 10 minutes at room temperature to obtain a slurry. The slurry thus obtained was put in a petri dish made of a PFA resin to dry the slurry at 60° C. under the air atmosphere. As a result, the solvent of the slurry was removed by evaporation to obtain an electrolyte membrane. The ratio S/T of the proton conductive inorganic oxide material S to the total membrane amount T was found to be 0.9, and the thickness of the electrolyte membrane was found to be 151 μm.

EXAMPLE 3

A mixed solution prepared by adding 5 g of silicon dioxide $SiO_2$ to 300 mL of distilled water having 2 g of ammonium molybdate $(NH_4)_6Mo_7O_{24}.4H_2O$ dissolved therein was heated to 80° C. while stirring the solution to remove water at an evaporating rate of 100 mL/hour. Then, the residue was left to stand at 100° C. for 12 hours within a drying apparatus to obtain a powdery material. The powdery material thus obtained was pulverized by using an agate mortar, followed by heating the pulverized powdery material within an alumina crucible to 700° C. at a heating rate of 100° C./hour. The pulverized material was held at 700° C. for 4 hours to obtain a proton conductive inorganic oxide powder, i.e., powder of a composite material formed of molybdenum dioxide supported by silicon oxide. The composite material was found to have 0.1 of an element ratio X/Y of the molybdenum element X in the molybdenum oxide to the silicon element Y in the silicon dioxide and also have a specific surface area as shown in Table 1.

The proton conductive inorganic oxide powder in an amount of 1 g was added to 2 g of a DMAc solution containing 5% of PAN, and the resultant system was kept stirred for 10 minutes at room temperature to obtain a slurry. The slurry thus obtained was put in a petri dish made of a PFA resin to dry the slurry at 60° C. under the air atmosphere. As a result, the solvent of the slurry was removed by evaporation to obtain an electrolyte membrane. The ratio S/T of the proton conductive inorganic oxide material S to the total membrane amount T was found to be 0.9, and the thickness of the electrolyte membrane was found to be 152 μm.

EXAMPLE 4

A mixed solution consisting of a solution prepared by adding 5 g of silicon dioxide $SiO_2$ to 300 mL of distilled water having 3 g of sodium tungstate dihydrate $NaWO_4.2H_2O$ dissolved therein and 150 mL of 0.1N aqueous solution of nitric acid was heated to 80° C. while stirring the mixed solution to remove water at an evaporating rate of 100 mL/hour. Then, the residue was left to stand at 100° C. for 12 hours within a drying apparatus to obtain a powdery material. The powdery material thus obtained was dispersed in 100 mL of 0.1N aqueous solution of nitric acid, followed by applying a suction filtration to remove the undesired sodium ions. The solid component obtained after the filtration was left to stand at 100° C. for 6 hours within a drying apparatus to remove water, followed by pulverizing the residue by using an agate mortar, and subsequently heating the pulverized powdery material within an alumina crucible to 700° C. at a heating rate of 100° C./hour. The pulverized material was held at 700° C. for 4 hours to obtain a proton conductive inorganic oxide powder, i.e., powder of a composite material formed of tungsten dioxide supported by silicon dioxide. The composite material was found to have 0.1 of an element ratio X/Y of the tungsten element X in the tungsten oxide to the silicon element Y in the silicon dioxide.

The proton conductive inorganic oxide powder in an amount of 1 g was added to 2 g of a DMAc solution containing 5% of PAN, and the resultant system was kept stirred for 10 minutes at room temperature to obtain a slurry. The slurry thus obtained was put in a petri dish made of a PFA resin to dry the slurry at 60° C. under the air atmosphere. As a result, the solvent of the slurry was removed by evaporation to obtain an electrolyte membrane. The ratio S/T of the proton conductive inorganic oxide material S to the total membrane amount T was found to be 0.9, and the thickness of the electrolyte membrane was found to be 152 μm.

EXAMPLE 5

A proton conductive inorganic oxide powder, i.e., a powder of vanadium oxide supported by titanium oxide, was obtained as in Example 1, except that 7 g of titanium oxide ($TiO_2$) was substituted for 5 g of silicon dioxide used in Example 1, followed by obtaining a proton conductive inorganic oxide-PAN composite electrolyte membrane by using the proton conductive inorganic oxide powder thus obtained. The element ratio X/Y of the vanadium element X in the vanadium oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 152 μm.

EXAMPLE 6

A proton conductive inorganic oxide powder, i.e., a powder of chromium oxide supported by titanium oxide, was obtained as in Example 1, except that 7 g of titanium oxide ($TiO_2$) was substituted for 5 g of silicon dioxide used in Example 1, followed by obtaining a proton conductive inorganic oxide material-PAN composite electrolyte membrane by using the proton conductive inorganic oxide powder thus obtained. The element ratio X/Y of the chromium element X in the chromium oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 153 μm.

EXAMPLE 7

A proton conductive inorganic oxide powder, i.e., a powder of molybdenum oxide supported by titanium oxide, was obtained as in Example 1, except that 7 g of titanium oxide ($TiO_2$) was substituted for 5 g of silicon dioxide used in Example 1, followed by obtaining a proton conductive inorganic oxide material-PAN composite electrolyte membrane by using the proton conductive inorganic oxide powder thus obtained. The element ratio X/Y of the molybdenum element X in the molybdenum oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 151 μm.

EXAMPLE 8

A proton conductive inorganic oxide powder, i.e., a powder of tungsten oxide supported by titanium oxide, was obtained as in Example 1, except that 7 g of titanium oxide ($TiO_2$) was substituted for 5 g of silicon dioxide used in Example 1, followed by obtaining a proton conductive inorganic oxide material-PAN composite electrolyte membrane by using the proton conductive inorganic oxide powder thus obtained. The element ratio X/Y of the tungsten element X in the tungsten oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 150 μm.

EXAMPLE 9

A proton conductive inorganic oxide powder, i.e., a powder of vanadium oxide supported by zirconium oxide, was obtained as in Example 1, except that 11 g of zirconium oxide ($ZrO_2$) was substituted for 5 g of silicon dioxide used in Example 1, followed by obtaining a proton conductive inorganic oxide material-PAN composite electrolyte membrane by using the proton conductive inorganic oxide powder thus obtained. The element ratio X/Y of the vanadium element X in the vanadium oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 148 μm.

EXAMPLE 10

A proton conductive inorganic oxide powder, i.e., a powder of chromium oxide supported by zirconium oxide, was obtained as in Example 2, except that 11 g of zirconium oxide ($ZrO_2$) was substituted for 5 g of silicon dioxide used in Example 2, followed by obtaining a proton conductive inorganic oxide material-PAN composite electrolyte membrane by using the proton conductive inorganic oxide powder thus obtained. The element ratio X/Y of the chromium element X in the chromium oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 150 μm.

EXAMPLE 11

A proton conductive inorganic oxide powder, i.e., a powder of molybdenum oxide supported by zirconium oxide, was obtained as in Example 3, except that 11 g of zirconium oxide ($ZrO_2$) was substituted for 5 g of silicon dioxide used in Example 3, followed by obtaining a proton conductive inorganic oxide material-PAN composite electrolyte membrane by using the proton conductive inorganic oxide powder thus obtained. The element ratio X/Y of the molybdenum element X in the molybdenum oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 152 μm.

EXAMPLE 12

A proton conductive inorganic oxide powder, i.e., a powder of tungsten oxide supported by zirconium oxide, was obtained as in Example 4, except that 11 g of zirconium oxide ($ZrO_2$) was substituted for 5 g of silicon dioxide used in Example 4, followed by obtaining a proton conductive inorganic oxide material-PAN composite electrolyte membrane by using the proton conductive inorganic oxide powder thus obtained. The element ratio X/Y of the tungsten element X in the tungsten oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 155 μm.

EXAMPLE 13

A proton conductive inorganic oxide powder, i.e., a composite oxide powder consisting of vanadium oxide supported by zirconia-silica composite oxide, was obtained as in Example 1, except that 16 g of zirconia-silica composite oxide (ZrSiO$_4$) was substituted for 5 g of silicon dioxide used in Example 1, followed by obtaining a proton conductive inorganic oxide material-PAN composite electrolyte membrane by using the proton conductive inorganic oxide powder thus obtained. The element ratio X/Y of the vanadium element X in the vanadium oxide to the zirconium and silicon elements Y in the zirconia-silica composite oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 153 µm.

EXAMPLE 14

A proton conductive inorganic oxide powder, i.e., a composite oxide powder consisting of vanadium oxide supported by zirconia-silica composite oxide, was obtained as in Example 2, except that 16 g of zirconia-silica composite oxide (ZrSiO$_4$) was substituted for 5 g of silicon dioxide used in Example 2, followed by obtaining a proton conductive inorganic oxide material-PAN composite electrolyte membrane by using the proton conductive inorganic oxide powder thus obtained. The element ratio X/Y of the chromium element X in the chromium oxide to the zirconium and silicon elements Y in the zirconia-silica composite oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 155 µm.

EXAMPLE 15

A proton conductive inorganic oxide powder, i.e., a composite oxide powder consisting of molybdenum oxide supported by zirconia-silica composite oxide, was obtained as in Example 3, except that 16 g of zirconia-silica composite oxide (ZrSiO$_4$) was substituted for 5 g of silicon dioxide used in Example 3, followed by obtaining a proton conductive inorganic oxide material-PAN composite electrolyte membrane by using the proton conductive inorganic oxide powder thus obtained. The element ratio X/Y of the molybdenum element X in the molybdenum oxide to the zirconium and silicon elements Y in the zirconia-silica composite oxide in the proton conductive inorganic oxide powder thus obtained was found to be 0.1. Further, the ratio S/T of the proton conductive inorganic oxide material S to the total amount T of proton conductive inorganic oxide material-PAN composite electrolyte membrane was found to be 0.9, and the thickness of the electrolyte membrane was found to be 153 µm.

EXAMPLE 16

A proton conductive inorganic oxide powder, i.e., a composite oxide powder consisting of tungsten oxide supported by a zirconia-silica composite oxide, was obtained as in Example 4, except that 16 g of zirconia-silica composite oxide (ZrSiO$_4$) was substituted for 5 g of silicon dioxide used in Example 4. The element ratio X/Y of the tungsten element X in the tungsten oxide to the zirconium and silicon elements Y in the zirconia-silica composite oxide in the proton conductive inorganic oxide powder thus obtained was found to be 0.1.

EXAMPLE 17

A proton conductive inorganic oxide-PBI composite electrolyte membrane was obtained as in Example 1, except that a 5% DMAc solution containing 5% of polybenzimidazole (PBI) was substituted for a 5% DMAc solution of PAN used in Example 1. The element ratio X/Y of the vanadium element X in the vanadium oxide to the titanium element Y in the titanium oxide in the proton conductive inorganic oxide powder was found to be 0.1. Further, the ratio S/T of the proton conductive inorganic oxide material S to the total amount T of proton conductive inorganic oxide-PBI composite electrolyte membrane was found to be 0.9, and the thickness of the electrolyte membrane was found to be 150 µm.

EXAMPLE 18

A proton conductive inorganic oxide-PS composite electrolyte membrane was obtained as in Example 1, except that a 5% chloroform solution of polystyrene (PS) was substituted for a 5% DMAc solution of PAN used in Example 1. The element ratio X/Y of the vanadium element X in the vanadium oxide to the titanium element Y in the titanium oxide in the proton conductive inorganic oxide powder was found to be 0.1. Further, the ratio S/T of the proton conductive inorganic oxide material S to the total amount T of proton conductive inorganic oxide-PS composite electrolyte membrane was found to be 0.9, and the thickness of the electrolyte membrane was found to be 155 µm.

EXAMPLE 19

A proton conductive inorganic oxide powder, i.e., a powder of vanadium oxide supported by silicon dioxide, was obtained as in Example 1, except that 17 g of tetraethoxy silane (Si(OH$_5$)C$_2$)$_4$ was substituted for 5 g of silicon dioxide used in Example 1, followed by obtaining a proton conductive inorganic oxide material-PAN composite electrolyte membrane by using the proton conductive inorganic oxide powder thus obtained. The element ratio X/Y of the vanadium element X in the vanadium oxide to the silicon element Y in the silicon dioxide in the proton conductive inorganic oxide powder thus obtained was found to be 0.1. X-ray diffraction measurement was applied to the proton conductive inorganic oxide, with the result that diffraction peaks were not observed, indicating that each of vanadium oxide and silicon dioxide had an amorphous structure. Further, the ratio S/T of the proton conductive inorganic oxide material S to the total amount T of proton conductive inorganic oxide-PAN composite electrolyte membrane was found to be 0.9, and the thickness of the electrolyte membrane was found to be 153 µm.

COMPARATIVE EXAMPLE 1

Prepared was a metal oxide supporting sulfuric acid, which is disclosed in patent document 1 quoted previously. Specifically, 100 g of an aqueous solution of sulfuric acid was prepared by adding a distilled water to 6 g of a concentrated sulfuric acid (96%). Then, a slurry was prepared by adding 20 g of zirconium oxide (ZrO$_2$) to the aqueous solution of sulfuric acid and by stirring the resultant system for 3 hours. The slurry was heated from room temperature to 100° C. at a heating rate of 5° C./minute. The heated slurry was held at 100° C. for 3 hours to remove water from the slurry. Then, the slurry was further heated to 200° C. at a heating rate of 1°

C./minute, and the slurry was held at 200° C. for 3 hours to obtain a white powdery material. The white powdery material thus obtained was further heated to 500° C. at a heating rate of 1° C./minute and the heated powdery material was held at 500° C. for 3 hours to obtain a white powder of a proton conductive inorganic oxide formed of zirconia supporting sulfuric acid, i.e., $SO_4/ZrO_2$. The element ratio S/M of sulfur S contained in the sulfuric acid to the metal element M contained in the hydroxide carrier and/or the oxide carrier was found to be 0.03. Further, obtained was a proton conductive inorganic oxide material-PAN composite electrolyte membrane as in Example 1. The ratio S/T of the proton conductive inorganic oxide material S to the total amount T of proton conductive inorganic oxide material-PAN composite electrolyte membrane was found to be 0.9, and the composite electrolyte membrane was found to have a thickness of 155 μm.

COMPARATIVE EXAMPLE 2

Prepared as an electrolyte membrane was a NAFION 117 membrane manufactured by Dupont Inc.

The proton conductive membrane prepared in each of Examples 1 to 19 and Comparative Example 1 was slightly swollen when water was added to the proton conductive membrane to make it possible to peel off easily the proton conductive membrane from the petri dish made of a PFA resin. In this case, the membrane was found to be flexible and found to exhibit a solid super acidity when measured by an acidity indicator consisting of m-nitro toluene (pKa=−11.99), p-nitro fluorobenzene (pKa=−12.40), p-nitro chlorobenzene (pKa=−12.70), m-nitro chlorobenzene (pKa=−13.16), 2,4-dinitro toluene (pKa=−13.75), and 2,4-dinitro fluorobenzene (pKa=−14.52). Table 1 also shows the Hammett acidity function $H_0$ of each of the proton conductive membranes.

On the other hand, the amount of water required for swelling the proton conductive membrane prepared in Comparative Example 2 was larger than that required for swelling the proton conductive membrane prepared in each of the Examples.

Also, a liquid fuel cell was assembled by the method described in the following by using the electrolyte membrane prepared in each of Examples 1 to 19 and Comparative Examples 1 and 2.

Specifically, prepared was an oxidizing agent electrode 3 by allowing an electrode containing a cathode catalyst supporting platinum (catalyst amount: Pt 4 mg/cm$^2$, manufactured by E-tek In.) to be impregnated with a 5% NAFION solution. Also prepared was a fuel electrode 2 by allowing an electrode containing an anode catalyst supporting platinum and ruthenium (catalyst amount: Pt—Ru 4 mg/cm$^2$, manufactured by E-tek Inc.) to be impregnated with a 5% NAFION solution.

Then, a membrane electrode assembly 5 was prepared by arranging a proton conductive membrane 4 between the fuel electrode 2 and the oxidizing agent electrode 3 and applying a hot press bonding to the resultant structure at 120° C. for 5 minutes under the pressure of 100 kg/cm$^2$ to obtain a membrane electrode assembly.

In the next step, a porous carbon plate having an average pore diameter of 100 μm and a porosity of 70% was stacked as a fuel evaporating section 6 on the fuel electrode 2 of the membrane electrode assembly 5 thus obtained. Further, a porous carbon plate having an average pore diameter of 5 μm and a porosity of 40% was arranged as a fuel permeating section 7 on the fuel evaporating section 6. Still further, the resultant structure was arranged within the space defined between a holder 10 of the oxidizing agent electrode and a holder 11 of the fuel electrode to obtain a unit cell of the construction shown in FIG. 2. The holder 10 noted above was equipped with a groove 9 for supplying an oxidizing agent gas. The reaction area of the unit cell was 10 cm$^2$, and the groove 9 for supplying an oxidizing agent gas, which was formed in the holder 10 of the oxidizing agent, had a depth of 2 mm and a width of 1 mm.

A 20% aqueous solution of methanol used as a liquid fuel was introduced into the liquid fuel cell thus obtained from the side surface of the fuel permeating section 7 by utilizing the capillary action. On the other hand, the air at 1 atm used as an oxidizing agent gas was allowed to flow through the gas channel 9 at a flow rate of 100 mL/min to achieve the power generation. The carbon dioxide gas ($CO_2$) generated in accordance with the power generating reaction was released to the outside through the fuel evaporating section 6 as shown in FIG. 2. Table 1 also shows the maximum power density.

Table 1 also shows the results of measurement of the methanol permeability and the membrane resistance in respect of the proton conductive membrane in each of the Examples and the Comparative Examples. It should be noted that each of the methanol permeability and the membrane resistance is given by a relative value in Table 1 on the basis that each of the methanol permeability and the membrane resistance for NAFION 117 membrane for Comparative Example 2 was set at 1.

Incidentally, for measuring the methanol permeability, a proton conductive membrane having an area of 10 cm$^2$ was inserted into the cell to divide the cell into two sections. Then, a 10% aqueous solution of methanol was poured into one of the two divided cell sections and a pure water was poured into the other cell section, and the temperature of the system was kept at room temperature. A prescribed time later, the methanol concentration in the divided cell section having the pure water poured thereinto was measured by the gas chromatography to obtain the permeability of methanol. The proton conductive membrane was kept dipped in water for 16 hours to make the membrane usable as an electrolyte membrane, and the permeability of methanol was measured after the water was removed from the membrane.

Also, the electrical resistance of the membrane was measured by a four terminal DC method. Specifically, a proton conductive membrane was inserted between two cells each having an area of 10 cm$^2$. Then, a 10% aqueous solution of sulfuric acid was poured into each cell. Under this condition, a DC current was allowed to flow through the aqueous solution of sulfuric acid under room temperature to measure the voltage drop caused by the presence or absence of the proton conductive membrane, thereby measuring the conductivity.

TABLE 1

| | Oxide B element X | Element Y-containing oxide A | Element ratio (X/Y) | Specific surface area (m²/g) | Acidity function $H_0$ | Polymer material | Relative methanol permeablility | Relative membrane resistance | Maximum power density during use of a 20% aqueous solution of methanol (mW/cm²) |
|---|---|---|---|---|---|---|---|---|---|
| Example 1 | V | SiO$_2$ | 0.1 | 50 | −11.99 | PAN | 0.6 | 1.5 | 10 |
| Example 2 | Cr | SiO$_2$ | 0.1 | 52 | −11.99 | PAN | 0.5 | 1.4 | 11 |
| Example 3 | Mo | SiO$_2$ | 0.1 | 50 | −12.40 | PAN | 0.5 | 1.3 | 12 |
| Example 4 | W | SiO$_2$ | 0.1 | 50 | −12.40 | PAN | 0.5 | 1.3 | 12 |
| Example 5 | V | TiO$_2$ | 0.1 | 55 | −12.70 | PAN | 0.5 | 1.4 | 14 |
| Example 6 | Cr | TiO$_2$ | 0.1 | 53 | −12.70 | PAN | 0.4 | 1.4 | 15 |
| Example 7 | Mo | TiO$_2$ | 0.1 | 49 | −13.16 | PAN | 0.4 | 1.3 | 17 |
| Example 8 | W | TiO$_2$ | 0.1 | 55 | −13.16 | PAN | 0.3 | 1.3 | 18 |
| Example 9 | V | ZrO$_2$ | 0.1 | 50 | −13.75 | PAN | 0.2 | 1.2 | 20 |
| Example 10 | Cr | ZrO$_2$ | 0.1 | 50 | −13.75 | PAN | 0.3 | 1.1 | 23 |
| Example 11 | Mo | ZrO$_2$ | 0.1 | 54 | −14.50 | PAN | 0.2 | 1.2 | 24 |
| Example 12 | W | ZrO$_2$ | 0.1 | 53 | −14.50 | PAN | 0.2 | 1.1 | 26 |
| Example 13 | V | ZrSiO$_4$ | 0.1 | 55 | −13.16 | PAN | 0.4 | 1.3 | 14 |
| Example 14 | Cr | ZrSiO$_4$ | 0.1 | 50 | −13.16 | PAN | 0.3 | 1.2 | 15 |
| Example 15 | Mo | ZrSiO$_4$ | 0.1 | 54 | −13.75 | PAN | 0.4 | 1.3 | 14 |
| Example 16 | W | ZrSiO$_4$ | 0.1 | 51 | −13.75 | PAN | 0.3 | 1.1 | 18 |
| Example 17 | V | TiO$_2$ | 0.1 | 53 | −12.70 | PBI | 0.5 | 1.4 | 12 |
| Example 18 | V | TiO$_2$ | 0.1 | 52 | −12.70 | PS | 0.4 | 1.3 | 13 |
| Example 19 | V | SiO$_2$ | 0.1 | 51 | −12.40 | PAN | 0.6 | 1.2 | 13 |
| Comparative Example 1 | — | SO$_4$/ZrO$_2$ | — | 50 | −11.99 | PAN | 1.5 | 3.0 | 0.5 |
| Comparative Example 2 | — | — | — | — | — | — | 1.0 | 1.0 | 2.0 |

As is apparent from Table 1, the methanol permeability of the proton conductive membrane for each of Examples 1 to 19 was much lower than that of the NAFION 117 membrane for Comparative Example 2, and the resistance of the proton conductive membrane for each of Examples 1 to 19 was only several times as much as that for the NAFION 117 membrane for Comparative Example 2. Also, as is apparent from Examples 1, 17 and 18, the wettability between the inorganic material and the organic material and the dispersion capability of each of the inorganic and organic materials are changed by changing the polymer material used for preparing the membrane to affect the fine structure of the membrane, thereby changing the proton conductivity and the methanol permeability of the membrane. Also, as is apparent from Examples 1 and 19, the proton conductivity is changed by the change in the crystallinity of the proton conductive inorganic material. To be more specific, the amount of Lewis acid point for Example 19 in which each of the oxide particle B and the oxide carrier A was amorphous was larger than that for Example 1 in which the oxide particle B was amorphous and the oxide carrier A was crystalline to increase the degree of acidity and, thus, to exhibit a high proton conductivity.

As is apparent from Comparative Example 2 given in Table 1, in the fuel cell comprising a NAFION 117 membrane as an electrolyte membrane, the crossover was excessively large in the case of using a 20% methanol solution, with the result that the maximum power density obtained was only 2 mW/cm². On the other hand, in the fuel cell for each of Examples 1 to 19, in which a proton conductive membrane was used as the electrolyte membrane, it was possible to suppress the crossover to obtain a satisfactory power density. Particularly, the power density was large in the fuel cell for each of Examples 9 to 12, in which ZrO$_2$ was used as the oxide carrier of the proton conductive inorganic oxide material, and the largest power density was obtained in the fuel cell for Example 12 in which the tungsten oxide particles were supported by the oxide carrier of ZrO$_2$.

The stability with time of the cell performance was observed by using a unit cell in which the proton conductive membrane for each of Examples 1 to 19 was used as the electrolyte membrane. Specifically, a 20% aqueous solution of methanol was supplied as a fuel into the unit cell, and the air was allowed to flow into the unit cell. Under this condition, the both sides of the cell were heated to 40° C. to take out a current of 10 mA/cm², thereby measuring the stability with time of the cell performance. The output was found to be stable even several hours later. Further, a similar measurement was performed at 150° C., with the result that the output was found to be stable even several hours later.

The stability with time of the cell performance was also observed by using a fuel cell in which the NAFION 117 membrane for Comparative Example 2 was used as the electrolyte membrane. Specifically, a 20% aqueous solution of methanol was supplied as a liquid fuel into the fuel cell, and the air was allowed to flow into the fuel cell. Under this condition, the both sides of the cell were heated to 40° C. to take out a current of 10 mA/cm², thereby measuring the stability with time of the cell performance. It was found impossible to obtain the output only several minutes later. Further, a similar measurement was performed at 150° C., with the result that the electrolyte membrane was dried because it was impossible to control strictly the humidification to make it impossible to obtain the output.

EXAMPLE 20

A proton conductive inorganic oxide-PAN composite electrolyte membrane was obtained as in Example 1, except that the amount of proton conductive inorganic material powder, which was 1 g in Example 1, was changed into 0.7 g and that the amount of DMAc solution containing 5% of PAN, which was 2 g in Example 1, was changed into 1.3 g. In the proton conductive inorganic material powder, the element ratio X/Y of the vanadium element X of the vanadium oxide to the silicon element Y of the silicon dioxide was 0.1. The ratio S/T of the proton conductive inorganic material S to the total amount T of the electrolyte membrane was 0.9, and the thickness of the electrolyte membrane thus obtained was 100 μm.

A liquid fuel cell was manufactured as in Example 1 by using the electrolyte membrane thus obtained.

EXAMPLE 21

A proton conductive inorganic oxide-PAN composite electrolyte membrane was obtained as in Example 1, except that the amount of proton conductive inorganic material power, which was 1 g in Example 1, was changed into 0.3 g and that the amount of DMAc solution containing 5% of PAN, which was 2 g in Example 1, was changed into 0.7 g. In the proton conductive inorganic material power, the element ration X/Y of the vanadium element X of the vanadium oxide to the silicon element Y of the silicon dioxide was 0.1, The ratio S/T of the proton conductive inorganic material S to the total amount T of proton conductive inorganic oxide-PAN composite electrolyte membrane was 0.9, and the thickness of the electrolyte membrane thus obtained was 50 μm.

A liquid fuel cell was manufactured as in Example 1 by using the electrolyte membrane thus obtained.

The methanol permeability and the resistance of the proton conductive membrane and the maximum power density of fuel cell were measured as described previously for each of Examples 20 and 21. Table 2 shows the results together with the result for Example 1 described previously.

TABLE 2

| | Thickness of electrolyte membrane (μm) | Relative methanol permeability | Relative membrane resistance | Maximum power density during use of a 20% aqueous solution of methanol (mW/cm$^2$) |
|---|---|---|---|---|
| Example 1 | 152 | 0.6 | 1.5 | 10 |
| Example 20 | 100 | 0.7 | 1.3 | 11 |
| Example 21 | 50 | 0.8 | 1.1 | 12 |

As is apparent from Table 2, the diffusion distance of methanol is decreased with decrease in the thickness of the electrolyte membrane, with the result that the effective membrane resistance is lowered similarly in respect of the proton conduction. It is considered reasonable to understand that all of these conditions are combined to determine the membrane characteristics such that the membrane resistance is markedly decreased, though the methanol permeability is increased, with decrease in the thickness of the electrolyte membrane, thereby increasing the output.

EXAMPLE 22

Vanadium oxide supported by silicon dioxide, in which the element ratio X/Y of the vanadium element X of the vanadium oxide to the silicon element Y of the silicon dioxide was 0.2, was obtained as in Example 1, except that used was 3.5 g of silicon dioxide ($SiO_2$) particles having a specific surface area larger than that of the silicon dioxide particles used in Example 1, followed by obtaining a proton conductive inorganic oxide material-PAN composite electrolyte membrane by using the proton conductive inorganic oxide material thus obtained. The specific surface area of the proton conductive inorganic oxide material thus obtained was found to be 150 m$^2$/g. Further, the ratio S/T of the proton conductive inorganic oxide material S to the total amount T of proton conductive inorganic oxide material-PAN composite electrolyte membrane was 0.9, and the thickness of the electrolyte membrane was found to be 150 μm.

A liquid fuel cell was manufactured as in Example 1 by using the electrolyte membrane thus obtained.

EXAMPLE 23

A proton conductive inorganic oxide, i.e., vanadium oxide supported by silicon dioxide, in which the element ratio X/Y of the vanadium element X of the vanadium oxide to the silicon element Y of the silicon dioxide was 0.3, was obtained as in Example 1, except that used was 2.5 g of silicon dioxide ($SiO_2$) particles having a specific surface area larger than that of the silicon dioxide particles used in each of Examples 1 and 22, followed by obtaining a proton conductive inorganic oxide material-PAN composite electrolyte membrane by using the proton conductive inorganic oxide material thus obtained. The specific surface area of the proton conductive inorganic oxide material thus obtained was found to be 300 m$^2$/g. Further, the ratio S/T of the proton conductive inorganic oxide material S to the total amount T of proton conductive inorganic oxide material-PAN composite membrane was 0.9, and the thickness of the electrolyte membrane was found to be 151 μm.

A liquid fuel cell was manufactured as in Example 1 by using the electrolyte membrane thus obtained.

TABLE 3

| | Oxide B element X | Element Y-containing oxide A | Element ratio (X/Y) | Specific surface area (m$^2$/g) | Acidity function $H_0$ | Polymer material | Relative methanol permeability | Relative membrane resistance | Maximum power density during use of a 20% aqueous solution of methanol (mW/cm$^2$) |
|---|---|---|---|---|---|---|---|---|---|
| Example 1 | V | $SiO_2$ | 0.1 | 50 | −11.99 | PAN | 0.6 | 1.5 | 10 |
| Example 22 | V | $SiO_2$ | 0.2 | 150 | −11.99 | PAN | 0.6 | 1.3 | 12 |
| Example 23 | V | $SiO_2$ | 0.3 | 300 | −11.99 | PAN | 0.6 | 1.1 | 14 |

As is apparent from Table 3, it is considered reasonable to understand that the amount of Lewis acid point is increased with increase in the specific surface area of the $SiO_2$ particles and the amount of vanadium oxide. As a result, the proton conduction field is considered to be increased to lower the membrane resistance and, thus, to increase the output.

EXAMPLE 24

A slurry was prepared by mixing a proton conductive inorganic oxide material obtained in Example 1, a platinum-ruthenium supported catalyst, PAN and DMAc by the weight ratio of 0.45/0.45/0.1/5.0, followed by coating a carbon cloth of 32 mm×32 mm with the resultant slurry to obtain a fuel electrode having a catalyst amount of Pt—Ru 4 mg/cm$^2$.

Also prepared was a slurry by mixing a proton conductive inorganic oxide material obtained in Example 1, a platinum supported catalyst, PAN and DMAc by the weight ratio of 0.45/0.45/0.1/5.0, followed by coating a carbon cloth of 32 mm×32 mm with the resultant slurry to obtain an oxidizing agent electrode having a catalyst amount of Pt 4 mg/cm$^2$.

Further prepared as an electrolyte membrane was a NAFION 117 membrane similar to that used in Comparative Example 2.

Still further, a fuel cell was manufactured as in Example 1, except that the fuel electrode, the oxidizing agent electrode and the electrolyte membrane described above were used for manufacturing the fuel cell.

EXAMPLE 25

A fuel cell was manufactured as in Example 1, except that used were the fuel electrode and the oxidizing agent electrode obtained in Example 24 together with the proton conductive membrane obtained in Example 1.

The cell resistance and the maximum power density were measured for the fuel cell manufactured in each of Examples 24 and 25, with the results as shown in Table 4. Table 4 also shows the results for Example 1 and Comparative Example 2 described previously.

TABLE 4

| | Fuel electrode | Electrolyte membrane | Oxidizing agent electrode | Cell resistance (mΩ) | Maximum power density during use of a 20% aqueous solution of methanol (mW/cm$^2$) |
|---|---|---|---|---|---|
| Example 1 | Polymer containing perfluorosulfonic acid | Proton conductive inorganic oxide | Polymer containing perfluorosulfonic acid | 24 | 10 |
| Example 24 | Proton conductive inorganic oxide | Polymer containing perfluorosulfonic acid | Proton conductive inorganic oxide | 27 | 8 |
| Example 25 | Proton conductive inorganic oxide | Proton conductive inorganic oxide | Proton conductive inorganic oxide | 20 | 25 |
| Comparative Example 2 | Polymer containing perfluorosulfonic acid | Polymer containing perfluorosulfonic acid | Polymer containing perfluorosulfonic acid | 30 | 2.0 |

As is apparent from Table 4, the cell resistance was low because the proton conductor used in the fuel electrode, the oxidizing agent electrode or the electrolyte membrane had a low resistance. Also, since the methanol permeability of the electrolyte membrane obtained in Example 1 was low as shown in Table 1, the membrane electrode assembly obtained in each of Examples 1, 24 and 25 exhibited output characteristics superior to those of the membrane electrode assembly obtained in Comparative Example 2.

The proton conductive membrane obtained in each of Example 1 and Comparative Example 1 was subjected to a boiling treatment for one hour within a boiling water. After the boiling treatment, the conductivity (membrane resistance) and the methanol permeability of the proton conductive membrane were measured by the methods described previously, with results as shown in Table 5.

TABLE 5

| Electrolyte membrane | | Relative methanol permeability | Relative membrane resistance |
|---|---|---|---|
| Example 1 | Before treatment with boiling water | 0.9 | 1.5 |
| | After treatment with boiling water | 0.9 | 1.4 |
| Comparative Example 1 | Before treatment with boiling water | 1.5 | 3.0 |
| | After treatment with boiling water | 1.5 | 100 |
| NAFION 117 membrane | | 1.0 | 1.0 |

As shown in Table 5, the conductivity of the proton conductive membrane for Comparative Example 1 was markedly lowered after the treatment with a boiling water. It is considered reasonable to understand that the sulfate group supported on the surface of zirconia carrier was removed by the hydrolysis to markedly lower the conductivity of the proton conductive membrane for Comparative Example 1 after the treatment with a boiling water. On the other hand, the conductivity was less affected by the treatment with a boiling water in the proton conductive membrane for Example 1, supporting that the proton conductive membrane for Example 1 had a high resistance to heat and to the hydrolysis.

Such being the situation, it has been clarified that the proton conductive solid electrolyte of the present invention permits more effectively suppressing the methanol permeability while maintaining the proton conductivity. It follows that the present invention provides a proton conductive solid electrolyte that permits suppressing the crossover of a liquid fuel such as methanol and also permits stably maintaining the proton conductivity over a wide temperature range of between room temperature and a temperature of about 150° C.

EXAMPLE 26

A mixed solution prepared by adding 5 g of silicon dioxide $SiO_2$ to 300 mL of distilled water having 2 g of vanadium chloride $VCl_3$ dissolved therein was heated to 80° C. while stirring the solution to remove water at an evaporating rate of 100 mL/hour. Then, the residue was left to stand at 100° C. for 12 hours within a drying apparatus to obtain a powdery material. The powdery material thus obtained was pulverized by using an agate mortar, followed by heating the pulverized powdery material within an alumina crucible to 700° C. at a heating rate of 100° C./hour. The pulverized material was held at 700° C. for 4 hours to obtain a proton conductive inorganic oxide powder, i.e., a powder of a composite material formed of vanadium oxide supported by silicon dioxide. The composite material was found to have 0.1 of an element ratio X/Y of the vanadium element X in the vanadium oxide to the silicon element Y in the silicon dioxide and also have a specific surface area of 51 m$^2$/g. The proton conductive inorganic oxide powder was subjected to an X-ray diffraction measurement, with the result that all the diffraction peaks observed were found to have been derived from silicon dioxide, supporting that vanadium oxide had an amorphous structure.

Incidentally, the element ratio X/Y and the specific surface area of the proton conductive inorganic oxide powder were measured by the methods described in the following. Specifically, the element ratio X/Y was measured by an energy dispersion type X-ray analysis (EDX), an X-ray photoelectron spectroscopy (XPS) or an atomic absorption spectroscopy, and the specific surface area was measured by a BET method.

The proton conductive inorganic oxide powder in an amount of 1 g was added to 2 g of an aqueous solution containing 5% of polyvinyl alcohol (PVA), and the resultant system was kept stirred for 10 minutes at room temperature to obtain a slurry. The slurry thus obtained was put in a petri dish made of a tetrafluoroethylene-perfluoroalkoxy vinyl ether copolymer (PFA) to dry the slurry at 60° C. and 150° C. under an air atmosphere. As a result, the solvent of the slurry was removed by evaporation to obtain an electrolyte membrane. The ratio S/T of the proton conductive inorganic oxide material S to the total amount T of the electrolyte membrane was found to be 0.9, and the thickness of the electrolyte membrane was found to be 151 μm.

EXAMPLE 27

A mixed solution prepared by adding 5 g of silicon dioxide $SiO_2$ to 300 mL of distilled water having 3 g of chromium chloride hexahydrate $CrCl_3.6H_2O$ dissolved therein was heated to 80° C. while stirring the solution to remove water at an evaporating rate of 100 mL/hour. Then, the residue was left to stand at 100° C. for 12 hours within a drying apparatus to obtain a powdery material. The powdery material thus obtained was pulverized by using an agate mortar, followed by heating the pulverized powdery material within an alumina crucible to 700° C. at a heating rate of 100° C./hour. The pulverized material was held at 700° C. for 4 hours to obtain a proton conductive inorganic oxide powder, i.e., powder of a composite material formed of chromium oxide supported by silicon dioxide. The composite material was found to have 0.1 of an element ratio X/Y of the chromium element X in the chromium oxide to the silicon element Y in the silicon dioxide and also have a specific surface area of 52 m$^2$/g. The proton conductive inorganic oxide powder was subjected to an X-ray diffraction measurement, with the result that all the diffraction peaks observed were found to have been derived from silicon dioxide, supporting that chromium oxide had an amorphous structure.

The proton conductive inorganic oxide powder in an amount of 1 g was added to 2 g of an aqueous solution containing 5% of PVA, and the resultant system was kept stirred for 10 minutes at room temperature to obtain a slurry. The slurry thus obtained was put in a petri dish made of a PFA resin to dry the slurry at 60° C. and 150° C. under the air atmosphere. As a result, the solvent of the slurry was removed by evaporation to obtain an electrolyte membrane. The ratio S/T of the proton conductive inorganic oxide material S to the total membrane amount T was found to be 0.9, and the thickness of the electrolyte membrane was found to be 151 μm.

EXAMPLE 28

A mixed solution prepared by adding 5 g of silicon dioxide $SiO_2$ to 300 mL of distilled water having 2 g of ammonium molybdate $(NH_4)_6Mo_7O_{24}.4H_2O$ dissolved therein was heated to 80° C. while stirring the solution to remove water at an evaporating rate of 100 mL/hour. Then, the residue was left to stand at 100° C. for 12 hours within a drying apparatus to obtain a powdery material. The powdery material thus obtained was pulverized by using an agate mortar, followed by heating the pulverized powdery material within an alumina crucible to 700° C. at a heating rate of 100° C./hour. The pulverized material was held at 700° C. for 4 hours to obtain a proton conductive inorganic oxide powder having a specific surface area of 55 m$^2$/g, i.e., powder of a composite material formed of molybdenum oxide supported by silicon dioxide. The composite material was found to have 0.1 of an element ratio X/Y of the molybdenum element X in the molybdenum oxide to the silicon element Y in the silicon dioxide and also have a specific surface area of 55 m$^2$/g. The proton conductive inorganic oxide powder was subjected to an X-ray diffraction measurement, with the result that all the diffraction peaks observed were found to have been derived from silicon dioxide, supporting that molybdenum oxide had an amorphous structure.

The proton conductive inorganic oxide powder in an amount of 1 g was added to 2 g of an aqueous solution containing 5% of PVA, and the resultant system was kept stirred for 10 minutes at room temperature to obtain a slurry. The slurry thus obtained was put in a petri dish made of a PFA resin to dry the slurry at 60° C. and 150° C. under the air atmosphere. As a result, the solvent of the slurry was removed by evaporation to obtain an electrolyte membrane. The ratio S/T of the proton conductive inorganic oxide material S to the total amount T of the electrolyte membrane was found to be 0.9, and the thickness of the electrolyte membrane was found to be 155 μm.

EXAMPLE 29

A mixed solution consisting of a solution prepared by adding 5 g of silicon dioxide $SiO_2$ to 300 mL of distilled water having 3 g of sodium tungstate dihydrate $NaWO_4.2H_2O$ dissolved therein and 150 mL of 0.1N aqueous solution of nitric acid was heated to 80° C. while stirring the mixed solution to remove water at an evaporating rate of 100 mL/hour. Then, the residue was left to stand at 100° C. for 12 hours within a drying apparatus to obtain a powdery material. The powdery material thus obtained was dispersed in 100 mL of 0.1N aqueous solution of nitric acid, followed by applying a suction filtration to remove the undesired sodium ions. The solid component obtained after the filtration was left to stand at 100° C. for 6 hours within a drying apparatus to remove water, followed by pulverizing the residue by using an agate mortar, and subsequently heating the pulverized powdery material within an alumina crucible to 700° C. at a heating rate of 100° C./hour. The pulverized material was held at 700° C. for 4 hours to obtain a proton conductive inorganic oxide powder having a specific surface area of 50 m$^2$/g, i.e., powder of a composite material formed of tungsten oxide supported by silicon dioxide. The composite material was found to have 0.1 of an element ratio X/Y of the tungsten element X in the tungsten oxide to the silicon element Y in the silicon dioxide. The proton conductive inorganic oxide powder was subjected to an X-ray diffraction measurement, with the result that all the diffraction peaks observed were found to have been derived from silicon dioxide, supporting that tungsten oxide had an amorphous structure.

The proton conductive inorganic oxide powder in an amount of 1 g was added to 2 g of an aqueous solution containing 5% of PVA, and the resultant system was kept stirred for 10 minutes at room temperature to obtain a slurry. The slurry thus obtained was put in a petri dish made of a PFA resin to dry the slurry at 60° C. and 150° C. under the air atmosphere. As a result, the solvent of the slurry was removed by evaporation to obtain an electrolyte membrane. The ratio S/T of the proton conductive inorganic oxide material S to the total amount T of the electrolyte membrane was found to be 0.9, and the thickness of the electrolyte membrane was found to be 150 μm.

EXAMPLE 30

A proton conductive inorganic oxide powder having a specific surface area of 54 m$^2$/g, i.e., a powder of vanadium oxide supported by titanium oxide, was obtained as in Example 26, except that 7 g of titanium oxide (TiO$_2$) was substituted for 5 g of silicon dioxide used in Example 26, followed by obtaining a proton conductive inorganic oxide material-PVA composite electrolyte membrane by using the proton conductive inorganic oxide material thus obtained. The element ratio X/Y of the vanadium element X in the vanadium oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 155 μm.

EXAMPLE 31

A proton conductive inorganic oxide powder having a specific surface area of 49 m$^2$/g, i.e., a powder of chromium oxide supported by titanium oxide, was obtained as in Example 27, except that 7 g of titanium oxide (TiO$_2$) was substituted for 5 g of silicon dioxide used in Example 27, followed by obtaining a proton conductive inorganic oxide material-PVA composite electrolyte membrane by using the proton conductive inorganic oxide material thus obtained. The element ratio X/Y of the chromium element X in the chromium oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 157 μm.

EXAMPLE 32

A proton conductive inorganic oxide powder having a specific surface area of 48 m$^2$/g, i.e., a powder of molybdenum oxide supported by titanium oxide, was obtained as in Example 28, except that 7 g of titanium oxide (TiO$_2$) was substituted for 5 g of silicon dioxide used in Example 28, followed by obtaining a proton conductive inorganic oxide material-PVA composite electrolyte membrane by using the proton conductive inorganic oxide material thus obtained. The element ratio X/Y of the molybdenum element X in the molybdenum oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 150 μm.

EXAMPLE 33

A proton conductive inorganic oxide powder having a specific surface area of 50 m$^2$/g, i.e., a powder of tungsten oxide supported by titanium oxide, was obtained as in Example 29, except that 7 g of titanium oxide (TiO$_2$) was substituted for 5 g of silicon dioxide used in Example 29, followed by obtaining a proton conductive inorganic oxide material-PVA composite electrolyte membrane by using the proton conductive inorganic oxide material thus obtained. The element ratio X/Y of the tungsten element X in the tungsten oxide to the titanium element Y in the titanium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 154 μm.

EXAMPLE 34

A proton conductive inorganic oxide powder, i.e., a powder of vanadium oxide supported by zirconium oxide and having a specific surface area of 53 m$^2$/g, was obtained as in Example 26, except that 11 g of zirconium oxide (ZrO$_2$) was substituted for 5 g of silicon dioxide used in Example 26, followed by obtaining a proton conductive inorganic oxide material-PVA composite electrolyte membrane by using the proton conductive inorganic oxide material thus obtained. The element ratio X/Y of the vanadium element X in the vanadium oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 149 μm.

EXAMPLE 35

A proton conductive inorganic oxide powder, i.e., a powder of chromium oxide supported by zirconium oxide and having a specific surface area of 50 m$^2$/g, was obtained as in Example 27, except that 11 g of zirconium oxide (ZrO$_2$) was substituted for 5 g of silicon dioxide used in Example 27, followed by obtaining a proton conductive inorganic oxide material-PVA composite electrolyte membrane by using the proton conductive inorganic oxide material thus obtained. The element ratio X/Y of the chromium element X in the chromium oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 151 μm.

EXAMPLE 36

A proton conductive inorganic oxide powder, i.e., a powder of molybdenum oxide supported by zirconium oxide and having a specific surface area of 51 m$^2$\g, was obtained as in Example 28, except that 11 g of zirconium oxide (ZrO$_2$) was substituted for 5 g of silicon dioxide used in Example 28, followed by obtaining a proton conductive inorganic oxide material-PVA composite electrolyte membrane by using the proton conductive inorganic oxide material thus obtained. The element ratio X/Y of the molybdenum element X in the molybdenum oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 151 μm.

EXAMPLE 37

A proton conductive inorganic oxide powder, i.e., a powder of tungsten oxide supported by zirconium oxide having a specific surface area of 50 m$^2$/g, was obtained as in Example 29, except that 11 g of zirconium oxide (ZrO$_2$) was substituted for 5 g of silicon dioxide used in Example 29, followed by obtaining a proton conductive inorganic oxide material-PVA composite electrolyte membrane by using the proton conductive inorganic oxide material thus obtained. The element ratio X/Y of the tungsten element X in the tungsten oxide to the zirconium element Y in the zirconium oxide in the proton conductive inorganic oxide powder thus obtained was found to be 0.1. Further, the ratio S/T of the proton conductive inorganic oxide material S to the total amount T of proton conductive inorganic oxide material-PVA composite electrolyte membrane was found to be 0.9, and the thickness of the electrolyte membrane was found to be 153 μm.

EXAMPLE 38

A proton conductive inorganic oxide material-PVA•PA composite electrolyte membrane was obtained as in Example 26, except that 2 g of a mixed solution consisting of 1.5 g of an aqueous solution containing 5% of PVA and 0.5 g of an aqueous solution containing 5% of polyacrylic acid (PA) was substituted for 2 g of an aqueous solution containing 5% of PVA used in Example 26. The proton conductive inorganic oxide powder had a specific surface area of 53 m$^2$/g. The element ratio X/Y of the vanadium element X in the vanadium oxide to the silicon element Y in the silicon dioxide in the proton conductive inorganic oxide powder was found to be 0.1. Further, the ratio S/T of the proton conductive inorganic oxide material S to the total amount T of proton conductive inorganic oxide material-PVA-PA composite electrolyte membrane was found to be 0.9, and the thickness of the electrolyte membrane was found to be 153 μm.

EXAMPLE 39

A proton conductive inorganic oxide-material-PVA•PA composite electrolyte membrane was obtained as in Example 27, except that 2 g of a mixed solution consisting of 1.5 g of an aqueous solution containing 5% of PVA and 0.5 g of an aqueous solution containing 5% of polyacrylic acid (PA) was substituted for 2 g of an aqueous solution containing 5% of PVA used in Example 27. The proton conductive inorganic oxide powder had a specific surface area of 54 m$^2$/g. The element ratio X/Y of the chromium element X in the chromium oxide to the silicon element Y in the silicon dioxide in the proton conductive inorganic oxide powder thus obtained was found to be 0.1. Further, the ratio S/T of the proton conductive inorganic oxide material S to the total amount T of proton conductive inorganic oxide material-PVA•PA composite electrolyte membrane was found to be 0.9, and the thickness of the electrolyte membrane was found to be 151 μm.

EXAMPLE 40

A proton conductive inorganic oxide material-PVA•PA composite electrolyte membrane was obtained as in Example 28, except that 2 g of a mixed solution consisting of 1.5 g of an aqueous solution containing 5% of PVA and 0.5 g of an aqueous solution containing 5% of polyacrylic acid (PA) was substituted for 2 g of an aqueous solution containing 5% of PVA used in Example 28. The proton conductive inorganic oxide powder had a specific surface area of 50 m$^2$/g. The element ratio X/Y of the molybdenum element X in the molybdenum oxide to the silicon element Y in the silicon dioxide in the proton conductive inorganic oxide powder thus obtained was found to be 0.1. Further, the ratio S/T of the proton conductive inorganic oxide material S to the total amount T of proton conductive inorganic oxide material-PVA•PA composite electrolyte membrane was found to be 0.9, and the thickness of the electrolyte membrane was found to be 155 μm.

EXAMPLE 41

A proton conductive inorganic oxide material-PVA•PA composite electrolyte membrane was obtained as in Example 29, except that 2 g of a mixed solution consisting of 1.5 g of an aqueous solution containing 5% of PVA and 0.5 g of an aqueous solution containing 5% of polyacrylic acid (PA) was substituted for 2 g of an aqueous solution containing 5% of PVA used in Example 29. The proton conductive inorganic oxide powder had a specific surface area of 51 m$^2$/g. The element ratio X/Y of the tungsten element X in the tungsten oxide to the silicon element Y in the silicon dioxide in the proton conductive inorganic oxide powder thus obtained was found to be 0.1. Further, the ratio S/T of the proton conductive inorganic oxide material S to the total amount T of proton conductive inorganic oxide material-PVA•PA composite electrolyte membrane was found to be 0.9, and the thickness of the electrolyte membrane was found to be 150 μm.

EXAMPLE 42

A proton conductive inorganic oxide material-PEG composite electrolyte membrane was obtained as in Example 30, except that 2 g of an aqueous solution containing 5% of polyethylene glycol (PEG) was substituted for 2 g of the aqueous solution containing 5% of PVA, which was used in Example 30. The proton conductive inorganic oxide powder had a specific surface area of 52 m$^2$/g. The element ratio X/Y of the vanadium element X in the vanadium oxide to the titanium element Y in the titanium dioxide in the proton conductive inorganic oxide powder was found to be 0.1. Further, the ratio S/T of the proton conductive inorganic oxide material S to the total amount T of proton conductive inorganic oxide material-PEG composite electrolyte membrane was found to be 0.9, and the thickness of the electrolyte membrane was found to be 151 µm.

EXAMPLE 43

A proton conductive inorganic oxide material-Nylon 6 composite electrolyte membrane was obtained as in Example 30, except that 2 g of a formic acid solution containing 5% of Nylon 6 was substituted for 2 g of the aqueous solution containing 5% of PVA, which was used in Example 30. The proton conductive inorganic oxide powder had a specific surface area of 51 $m^2/g$. The element ratio X/Y of the vanadium element X in the vanadium oxide to the titanium element Y in the titanium dioxide in the proton conductive inorganic oxide powder thus obtained was found to be 0.1. Further, the ratio S/T of the proton conductive inorganic oxide material S to the total amount T of proton conductive inorganic oxide material-Nylon 6 composite electrolyte membrane was found to be 0.9, and the thickness of the electrolyte membrane was found to be 157 µm.

EXAMPLE 44

A proton conductive inorganic oxide material-PS composite electrolyte membrane was obtained as in Example 30, except that 2 g of a toluene solution containing 5% of polystyrene (PS) was substituted for 2 g of the aqueous solution containing 5% of PVA, which was used in Example 30. The proton conductive inorganic oxide powder had a specific surface area of 54 $m^2/g$. The element ratio X/Y of the vanadium element X in the vanadium oxide to the titanium element Y in the titanium dioxide in the proton conductive inorganic oxide powder was found to be 0.1. Further, the ratio S/T of the proton conductive inorganic oxide material S to the total amount T of proton conductive inorganic oxide material-PS composite electrolyte membrane was found to be 0.9, and the thickness of the electrolyte membrane was found to be 155 µm.

COMPARATIVE EXAMPLE 3

Prepared as an electrolyte membrane was a NAFION 117 membrane (registered trade mark) manufactured by Dupont Inc.

The proton conductive membrane prepared in each of Examples 26 to 43 was greatly swollen when water was added to the proton conductive membrane to make it possible to peel off easily the proton conductive membrane from the petri dish made of a PFA resin. In this case, the membrane was found to be flexible and found to exhibit a solid super acidity when measured by an acidity indicator consisting of m-nitro toluene (pKa=−11.99), p-nitro fluorobenzene (pKa=−12.40), p-nitro chlorobenzene (pKa=−12.70), m-nitro chlorobenzene (pKa=−13.16), 2,4-dinitro toluene (pKa=−13.75), and 2,4-dinitro fluorobenzene (pKa=−14.52). Table 6 shows the Hammett acidity function $H_0$ of each of the proton conductive membranes.

On the other hand, the amount of water required for swelling the proton conductive membrane prepared in Example 44 was larger than that required for swelling the proton conductive membrane prepared in each of Examples 26 to 43.

Also, a liquid fuel cell was assembled by the method described in the following by using the electrolyte membrane prepared in each of Examples 26 to 44 and Comparative Example 3.

Specifically, prepared first was an oxidizing agent electrode 3 by allowing an electrode containing a cathode catalyst supporting platinum (catalyst amount: Pt 4 $mg/cm^2$, manufactured by E-tek In.) to be impregnated with a 5% NAFION solution. Also prepared was a fuel electrode 2 by allowing an electrode containing an anode catalyst supporting platinum and ruthenium (catalyst amount: Pt—Ru 4 $mg/cm^2$, manufactured by E-tek Inc.) to be impregnated with a 5% NAFION solution.

Then, a membrane electrode assembly 5 was prepared by arranging a proton conductive membrane 4 between the fuel electrode 2 and the oxidizing agent electrode 3 and applying hot press bonding to the resultant structure at 120° C. for 5 minutes under a pressure of 100 $kg/cm^2$ to obtain a membrane electrode assembly.

In the next step, a porous carbon plate having an average pore diameter of 100 µm and a porosity of 70% was stacked as a fuel evaporating section 6 on the fuel electrode 2 included in the membrane electrode assembly 5 thus obtained. Further, a porous carbon plate having an average pore diameter of 5 µm and a porosity of 40% was arranged as a fuel permeating section 7 on the fuel evaporating section 6. Still further, the resultant structure was arranged within the space defined between a holder 10 of the oxidizing agent electrode and a holder 11 of the fuel electrode to obtain a unit cell of the construction shown in FIG. 2. The holder 10 noted above was equipped with a groove 9 for supplying an oxidizing agent gas. The reaction area of the unit cell was 10 $cm^2$, and the groove 9 for supplying an oxidizing agent gas, which was formed in the holder 10 of the oxidizing agent, had a depth of 2 mm and a width of 1 mm.

A 20% aqueous solution of methanol used as a liquid fuel was introduced into the liquid fuel cell thus obtained from the side surface of the fuel permeating section 7 by utilizing the capillary action. On the other hand, the air at 1 atm used as an oxidizing agent gas was allowed to flow through the gas channel 9 at a flow rate of 100 mL/min to achieve the power generation. The carbon dioxide gas ($CO_2$) generated in accordance with the power generating reaction was released to the outside through the fuel evaporating section 6 as shown in FIG. 2. Table 6 also shows the maximum power density.

Further, Table 6 shows the results of measurement of the methanol permeability and the membrane resistance in the proton conductive membranes. It should be noted that each of the methanol permeability and the membrane resistance is given in Table 6 by a relative value on the basis that each of the methanol permeability and the membrane resistance for NAFION 117 membrane for Comparative Example 3 was set at 1.

Incidentally, for measuring the methanol permeability, a proton conductive membrane having an area of 10 $cm^2$ was inserted into the cell to divide the cell into two sections. Then, a 10% aqueous solution of methanol was poured into one of the two cell sections and a pure water was poured into the other cell section, and the temperature of the system was kept at room temperature. A prescribed time later, the methanol concentration in the divided cell section having the pure water poured thereinto was measured by the gas chromatography to obtain the permeability of methanol. The proton conductive membrane was kept dipped in water for 16 hours, and the permeability of methanol was measured after the water was removed from the membrane.

Also, the electrical resistance of the membrane was measured by a four terminal DC method. Specifically, a proton conductive membrane was inserted between two cells each having an area of 10 $cm^2$. Then, a 10% aqueous solution of sulfuric acid was poured into each cell. Under this condition, a DC current was allowed to flow through the aqueous solution of sulfuric acid under room temperature to measure the voltage drop caused by the presence or absence of the proton conductive membrane, thereby measuring the membrane resistance.

obtained from the fuel cell for each of Examples 34 to 37, in which $ZrO_2$ was used as the oxide carrier, and the largest power density was obtained in the fuel cell for Example 37 in which the tungsten oxide particles were supported by the oxide carrier of $ZrO_2$.

TABLE 6

| | Oxide B element X | Element Y-containing oxide A | Element ratio (X/Y) | Ecidity function $H_0$ | Hydrophilic polymer | Equilibrium moisture absorption rate (%) | Relative methanol permeability | Relative membrane resistance | Maximum power density during use of a 20% aqueous solution of methanol (mW/cm²) |
|---|---|---|---|---|---|---|---|---|---|
| Example 26 | V | $SiO_2$ | 0.1 | −11.99 | PVA | 25 | 0.8 | 0.9 | 15 |
| Example 27 | Cr | $SiO_2$ | 0.1 | −11.99 | PVA | 25 | 0.8 | 0.8 | 16 |
| Example 28 | Mo | $SiO_2$ | 0.1 | −12.40 | PVA | 25 | 0.7 | 0.8 | 17 |
| Example 29 | W | $SiO_2$ | 0.1 | −12.40 | PVA | 25 | 0.7 | 0.7 | 18 |
| Example 30 | V | $TiO_2$ | 0.1 | −12.70 | PVA | 25 | 0.7 | 0.6 | 23 |
| Example 31 | Cr | $TiO_2$ | 0.1 | −12.70 | PVA | 25 | 0.6 | 0.6 | 24 |
| Example 32 | Mo | $TiO_2$ | 0.1 | −13.16 | PVA | 25 | 0.5 | 0.5 | 26 |
| Example 33 | W | $TiO_2$ | 0.1 | −13.16 | PVA | 25 | 0.5 | 0.4 | 27 |
| Example 34 | V | $ZrO_2$ | 0.1 | −13.75 | PVA | 25 | 0.4 | 0.4 | 30 |
| Example 35 | Cr | $ZrO_2$ | 0.1 | −13.75 | PVA | 25 | 0.4 | 0.3 | 31 |
| Example 36 | Mo | $ZrO_2$ | 0.1 | −14.50 | PVA | 25 | 0.3 | 0.3 | 34 |
| Example 37 | W | $ZrO_2$ | 0.1 | −14.50 | PVA | 25 | 0.3 | 0.2 | 36 |
| Example 38 | V | $SiO_2$ | 0.1 | −13.16 | PVA · PA | 32 | 0.9 | 0.3 | 20 |
| Example 39 | Cr | $SiO_2$ | 0.1 | −13.16 | PVA · PA | 32 | 0.9 | 0.3 | 21 |
| Example 40 | Mo | $SiO_2$ | 0.1 | −13.75 | PVA · PA | 32 | 0.8 | 0.2 | 22 |
| Example 41 | W | $SiO_2$ | 0.1 | −13.75 | PVA · PA | 32 | 0.8 | 0.1 | 23 |
| Example 42 | V | $TiO_2$ | 0.1 | −12.70 | PEG | 20 | 0.6 | 0.7 | 19 |
| Example 43 | V | $TiO_2$ | 0.1 | −12.70 | Nylon6 | 10 | 0.5 | 0.8 | 16 |
| Example 44 | V | $TiO_2$ | 0.1 | −12.70 | PS | 0.05 | 0.4 | 1.3 | 13 |
| Comparative Example 3 | — | — | — | — | — | — | 1.0 | 1.0 | 2.0 |

As is apparent from Table 6, the methanol permeability and the resistance of the proton conductive membrane for each of Examples 26 to 43 were much lower than those of the NAFION 117 membrane for Comparative Example 3. Also, as is apparent from Examples 30, 42, 43 and 44, the moisture absorption rate of the polymer material are changed by changing the polymer material used for preparing the membrane. As a result, the wettability between the inorganic material and the organic material, the dispersibility and the water absorbing capacity are changed to affect the fine structure of the membrane, thereby changing the proton conductivity and the methanol permeability of the membrane. To be more specific, the resistance of the proton conductive membrane is decreased with increase in the equilibrium moisture absorption rate from 0.05% to 10%, 20% and, then, to 25%. It should also be noted that the methanol permeability is decreased with decrease in the equilibrium moisture absorption rate.

As is apparent from Comparative Example 3 given in Table 6, in the fuel cell comprising a NAFION 117 membrane as an electrolyte membrane, the crossover and the membrane resistance are increased in a 20% aqueous solution of methanol, with the result that the maximum power density obtained was only 2.0 mW/cm². On the other hand, in the fuel cell using a proton conductive membrane for each of Examples 26 to 44 as the electrolyte membrane, it was possible to suppress the crossover to obtain a satisfactory power density. Particularly, in the fuel cell using the proton conductive membrane for each of Examples 26 to 43 as the electrolyte membrane, it was possible to suppress the crossover and to lower the membrane resistance to make it possible to obtain a more satisfactory power density. Particularly, a large power density was The stability with time of the cell performance was observed by using a unit cell in which the proton conductive membrane for each of Examples 26 to 43 was used as the electrolyte membrane. Specifically, a 20% aqueous solution of methanol was supplied as a liquid fuel into the unit cell, and the air was allowed to flow into the unit cell. Under this condition, the both sides of the cell were heated to 40° C. to deliver a current density of 10 mA/cm², thereby measuring the stability with time of the cell performance. The output was found to be stable even several hours later. Further, a similar measurement was performed at 150° C., with the result that the output was found to be stable even several hours later.

The stability with time of the cell performance was also observed by using a fuel cell in which the NAFION 117 membrane (Comparative Example 3) was used as the electrolyte membrane. Specifically, a 20% aqueous solution of methanol was supplied as a liquid fuel into the fuel cell, and the air was allowed to flow into the fuel cell. Under this condition, the both sides of the cell were heated to 40° C. to take out a current density of 10 mA/cm², thereby measuring the stability with time of the cell performance. It was found impossible to obtain the output only several minutes later. Further, a similar measurement was performed at 150° C., with the result that the electrolyte membrane was dried because it was impossible to control strictly the humidification to make it impossible to obtain the output.

EXAMPLE 45

A proton conductive inorganic oxide material-PVA composite electrolyte membrane was obtained as in Example 26, except that 2 g of an aqueous solution containing 2% of PVA (saponification degree of 85%) was substituted for 2 g of the aqueous solution containing 5% of PVA (saponification degree of 100%) that was used in Example 26. In the proton conductive inorganic oxide material, a specific surface area was 53 m²/g, and the element ratio X/Y of the vanadium element X of the vanadium oxide to the silicon element Y of the silicon dioxide was 0.1. Also, the ratio S/T of the proton conductive inorganic oxide material S to the total amount T of proton conductive inorganic oxide material-PVA composite electrolyte membrane was 0.9, and the thickness of the electrolyte membrane was 151 μm.

EXAMPLE 46

A proton conductive inorganic oxide material-PVA composite electrolyte membrane was obtained as in Example 26, except that 2 g of an aqueous solution containing 2% of PVA (saponification degree of 70%) was substituted for 2 g of the aqueous solution containing 5% of PVA (saponification degree of 100%) that was used in Example 26. In the proton conductive inorganic oxide material, a specific surface area was 51 m²/g, and the element ratio X/Y of the vanadium element X of the vanadium oxide to the silicon element Y of the silicon dioxide was 0.1. Also, the ratio S/T of the proton conductive inorganic oxide material S to the total amount T of proton conductive inorganic oxide material-PVA composite electrolyte membrane was 0.9, and the thickness of the electrolyte membrane was 150 μm.

A liquid fuel cell was manufactured as in Example 26 by using the electrolyte membrane thus obtained.

The methanol permeability and the resistance of the proton conductive membrane and the maximum power density of fuel cell were measured as described previously for each of Examples 45 and 46. Table 7 shows the results together with the result for Example 26 described previously.

amount of water ceases to be supplied into the solid super acid. As a result, the permeability of methanol is also lowered, though the membrane resistance is increased. It is considered reasonable to understand that all of these conditions are combined to determine the membrane characteristics such that the output is improved with increase in the degree of saponification of PVA.

EXAMPLE 47

A proton conductive inorganic oxide material-PVA composite electrolyte membrane was obtained as in Example 26, except that the drying temperature, which was 150° C. in Example 26, was changed to 100° C. In the proton conductive inorganic oxide material, the element ratio X/Y of the vanadium element X of the vanadium oxide to the silicon element Y of the silicon dioxide was 0.1. The specific surface area of the proton conductive inorganic oxide material was found to be 53 m²/g. Further, the ratio S/T of the proton conductive inorganic oxide material S to the total amount T of proton conductive inorganic oxide material-PVA composite electrolyte membrane was 0.9, and the thickness of the electrolyte membrane was found to be 150 μm.

EXAMPLE 48

A proton conductive inorganic oxide material-PVA composite electrolyte membrane was obtained as in Example 26, except that the drying temperature, which was 150° C. in Example 26, was changed to 180° C. In the proton conductive inorganic oxide material, the element ratio X/Y of the vanadium element X of the vanadium oxide to the silicon element Y of the silicon dioxide was 0.1. The specific surface area of the proton conductive inorganic oxide material thus obtained was found to be 55 m²/g. Further, the ratio S/T of the proton conductive inorganic oxide material S to the total amount T of proton conductive inorganic oxide material-PVA composite electrolyte membrane was 0.9, and the thickness of the electrolyte membrane was found to be 151 μm.

A liquid fuel cell was manufactured as in Example 26 by using the electrolyte membrane thus obtained.

The methanol permeability and the resistance of the proton conductive membrane and the maximum power density of

TABLE 7

|  | Oxide B element X | Element Y-containing oxide A | Element ratio (X/Y) | Hydrophilic polymer | Saponification degree (%) | Equilibrium moisture absorption rate (%) | Relative methanol permeability | Relative membrane resistance | Maximum power density during use of a 20% aqueous solution of methanol (mW/cm²) |
|---|---|---|---|---|---|---|---|---|---|
| Example 26 | V | SiO₂ | 0.1 | PVA | 100 | 25 | 0.8 | 0.9 | 15 |
| Example 45 | V | SiO₂ | 0.1 | PVA | 85 | 20 | 0.7 | 1.0 | 14 |
| Example 46 | V | SiO₂ | 0.1 | PVA | 70 | 15 | 0.6 | 1.3 | 12 |

As is apparent from Table 7, the equilibrium moisture absorption rate is decreased with decrease in the saponification degree of PVA, with the result that a sufficiently large fuel cell were measured as described previously for each of Examples 47 and 48. Table 8 shows the results together with the result for Example 26 described previously.

TABLE 8

| | Oxide B element X | Element Y-containing oxide A | Element ratio (X/Y) | Hydrophilic polymer | Heat treating temperature | Equilibrium moisture absorption rate (%) | Relative methanol permeability | Relative membrane resistance | Maximum power density during use of a 20% aqueous solution of methanol (mW/cm$^2$) |
|---|---|---|---|---|---|---|---|---|---|
| Example 26 | V | SiO$_2$ | 0.1 | PVA | 150 | 25 | 0.8 | 0.9 | 15 |
| Example 47 | V | SiO$_2$ | 0.1 | PVA | 100 | 30 | 0.9 | 0.6 | 14 |
| Example 48 | V | SiO$_2$ | 0.1 | PVA | 180 | 3 | 0.5 | 1.3 | 13 |

As is apparent from Table 8, it has been found that the equilibrium moisture absorption rate was lowered with increase in the heat treating temperature. It is considered reasonable to understand that the reaction between PVA and the solid super acid is promoted with elevation in the heat treating temperature to convert the hydrophilic hydroxyl group within PVA into a hydrophobic ketone group and, thus, to lower the equilibrium moisture absorption rate. To be more specific, the water absorbing properties of the membrane were improved with decrease in the heat treating temperature to make it possible to supply a sufficiently large amount of water into the solid super acid and, thus, to decrease the membrane resistance. On the other hand, when it comes to the permeability of methanol, the density of the electrolyte membrane was increased in the case of applying a heat treatment under high temperatures to decrease the methanol permeability. It is considered reasonable to understand that all of these conditions are combined to determine the membrane characteristics, with the result that the highest output was obtained in the case of applying a heat treatment at 150° C.

EXAMPLE 49

A slurry was prepared by mixing a proton conductive inorganic oxide material obtained in Example 26, a platinum-ruthenium supported catalyst, PVA and water by the weight ratio of 0.45/0.45/0.1/5.0, followed by coating a carbon cloth of 32 mm×32 mm with the resultant slurry to obtain a fuel electrode having a catalyst amount of Pt—Ru 4 mg/cm$^2$.

Also prepared was a slurry by mixing a proton conductive inorganic oxide material obtained in Example 26, a platinum-supported catalyst, PVA and water by the weight ratio of 0.45/0.45/0.1/5.0, followed by coating a carbon cloth of 32 mm×32 mm with the resultant slurry to obtain an oxidizing agent electrode having a catalyst amount of Pt 4 mg/cm$^2$.

Further prepared as an electrolyte membrane was a NAFION 117 membrane similar to that used in Comparative Example 3.

Still further, a fuel cell was manufactured as in Example 26, except that the fuel electrode, the oxidizing agent electrode and the electrolyte membrane described above were used for manufacturing the fuel cell.

EXAMPLE 50

A fuel cell was manufactured as in Example 26, except that used were the fuel electrode and the oxidizing agent electrode obtained in Example 49.

The cell resistance and the maximum power density were measured for the fuel cell manufactured in each of Examples 49 and 50, with the results as shown in Table 9. Table 9 also shows the results for Example 26 and Comparative Example 3 described previously.

TABLE 9

| | Fuel electrode | Electrolyte membrane | Oxidizing agent electrode | Cell resistance (mΩ) | Maximum power density during use of a 20% aqueous solution of methanol (mW/cm$^2$) |
|---|---|---|---|---|---|
| Example 26 | Polymer containing perfluorosulfonic acid | Proton conductive inorganic oxide | Polymer containing perfluorosulfonic acid | 20 | 15 |
| Example 49 | Proton conductive inorganic oxide | Polymer containing perfluorosulfonic acid | Proton conductive inorganic oxide | 27 | 11 |
| Example 50 | Proton conductive inorganic oxide | Proton conductive inorganic oxide | Proton conductive inorganic oxide | 15 | 30 |
| Comparative Example 3 | Polymer containing perfluorosulfonic acid | Polymer containing perfluorosulfonic acid | Polymer containing perfluorosulfonic acid | 30 | 2.0 |

As is apparent from Table 9, the fuel cell for each of Examples 26, 49 and 50 exhibited output characteristics superior to those for the fuel cell for Comparative Example 3. It is considered reasonable to understand that the superior output characteristics were obtained in the fuel cell for each of Examples 26, 49 and 50, because the electrolyte membrane for Example 26 exhibited a low methanol permeability, the proton conductor used in the electrode for Example 49 exhibited a low resistance, and both the electrolyte membrane for Example 26 and the electrode for Example 49 were used in the fuel cell manufactured in Example 50, which exhibited the highest output.

As is apparent from the experimental data given above, it has been found possible to satisfy both the proton conductivity and the methanol permeability if at least one of the fuel electrode, the oxidizing agent electrode and the electrolyte membrane is allowed to contain a proton conductive material containing a proton conductive inorganic oxide and a hydrophilic polymer material. It follows that the present invention provides an electrode for a fuel cell, a membrane electrode assembly and a fuel cell, which permits producing a stable output.

As described above in detail, according to the embodiment of the present invention, it is possible to obtain a fuel cell, which is small in size, which exhibits a high performance, and which permits producing a stable output. Naturally, the present invention produces an amazing industrial value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A membrane electrode assembly comprising a fuel electrode, an oxidizing agent electrode, and an electrolyte membrane provided between the fuel electrode and the oxidizing agent electrode, wherein;

the fuel electrode and the oxidizing agent electrode contain a proton conductive inorganic oxide, a conductive carrier material and a metal catalyst carried on the conductive carrier material; and the proton conductive inorganic oxide includes an oxide carrier and oxide particles supported on a surface of the oxide carrier, wherein the proton conductive inorganic oxide has a Lewis acid point, the oxide carrier containing an oxide of an element Y consisting of at least one element selected from the group consisting of Ti, Zr, Si and Al, and the oxide particles containing an oxide of an element X consisting of at least one element selected from the group consisting of W, Mo, Cr and V; wherein at least one of the fuel electrode and the oxidizing agent electrode contains a hydrophilic polymer material selected from the group consisting of polyacrylic acid, polyethylene glycol, cellulose, polyamide and polyvinyl pyrrolidone, and wherein the proton conductive inorganic oxide has a specific surface area falling within a range of 10 m2/g to 2,000 m2/g, and the element ratio X/Y of the element X to the element Y falls within a range of 0.01 to 1.

2. The membrane electrode assembly according to claim 1, wherein the proton conductive inorganic oxide is formed of a solid super acid having a Hammett acidity function H0, which is smaller than −11.93.

3. The membrane electrode assembly according to claim 1, wherein the proton conductive inorganic oxide is obtained by allowing an oxide precursor containing at least one element selected from the group consisting of W, Mo, Cr and V to be supported by a surface of an oxide carrier precursor containing at least one element selected from the group consisting of Ti, Zr, Si and Al, followed by applying a heat treatment under temperatures of 200° C. to 1,000° C.

4. The membrane electrode assembly according to claim 1, wherein the electrolyte membrane is prepared by forming a slurry containing the proton conductive inorganic oxide and the hydrophilic polymer material into a film, followed by applying a heat treatment to the film under temperatures not higher than 200° C.

5. The membrane electrode assembly according to claim 1, wherein the hydrophilic polymer material exhibits an equilibrium moisture absorption rate not lower than 5% under temperatures not lower than 20° C.

6. The membrane electrode assembly according to claim 1, wherein the oxide particles are supported on the surface of the oxide carrier by a chemical bond.

7. The membrane electrode assembly according to claim 1, wherein the oxide of the element X comprises at least one oxide selected from the group consisting of tungsten dioxide, molybdenum dioxide, chromium dioxide and vanadium oxide.

8. The membrane electrode assembly according to claim 1, wherein the oxide of the element Y comprises at least one oxide selected from the group consisting of $TiO_2$, $ZrO_2$, $SiO_2$, $Al_2O_3$, $Al_2O_3$—$SiO_2$, $TiO_2$—$SiO_2$, $ZrO_2$—$SiO_2$ and $ZrSiO_4$.

* * * * *